United States Patent
Fritz et al.

(10) Patent No.: US 7,844,422 B2
(45) Date of Patent: Nov. 30, 2010

(54) METHOD AND SYSTEM FOR CHANGING A DESCRIPTION FOR A STATE TRANSITION FUNCTION OF A STATE MACHINE ENGINE

(75) Inventors: Rolf Fritz, Waldenbuch (DE); Markus Kaltenbach, Leinfelden (DE); Ulrich Mayer, Schoenbuch (DE); Thomas Pflueger, Leinfelden (DE); Cordt Starke, Weil der Stadt (DE); Jan Van Lunteren, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 637 days.

(21) Appl. No.: 11/740,558

(22) Filed: Apr. 26, 2007

(65) Prior Publication Data

US 2007/0282573 A1    Dec. 6, 2007

(30) Foreign Application Priority Data

May 30, 2006    (EP) .................................. 06114679

(51) Int. Cl.
*G06F 17/10* (2006.01)
(52) U.S. Cl. ......................................................... 703/2
(58) Field of Classification Search ................... 703/2; 705/7
See application file for complete search history.

(56) References Cited

U.S. PATENT DOCUMENTS 7,424,409 B2 *   9/2008   Ben-Gal et al. ................ 703/2
7,426,457 B2 *   9/2008   Martin et al. ................... 703/2
2006/0190310 A1 * 8/2006  Gudla et al. .................... 705/7

OTHER PUBLICATIONS

Levy et al., H. Should Caches Be Split or Shared? Analysis Using the Superposition of Bursty Stack Depth Processes, Sciencedirect, Performance Evaluation, vol. 27-28, Oct. 1996, pp. 175-188.*

Wang et al., Probability of State Transition Errors in a Finite State Machine Containing Soft Failures, IEEE Transactions on Computers, vol. C-33, No. 3, 1984, pp. 269-277.*

* cited by examiner

*Primary Examiner*—Russell Frejd
(74) *Attorney, Agent, or Firm*—Matthew C. Zehrer

(57) ABSTRACT

The invention relates to a method of optimizing a state transition function specification for a state machine engine based on a probability distribution for the state transitions. For the preferred embodiment of the invention, a B-FSM state machine engine accesses a transition rule memory using a processor cache. The invention allows improving the cache hit rate by exploiting the probability distribution. The N transition rules that comprise a hash table entry will be loaded in a burst mode from the main memory, from which the N transition rules are transferred to the processor cache. Because the comparison of the actual state and input values against each of the transition rules can immediately start after each of these rules has been received, the overall performance is improved as the transition rule that is most likely to be selected is the first to be transferred as part of the burst access.

7 Claims, 15 Drawing Sheets

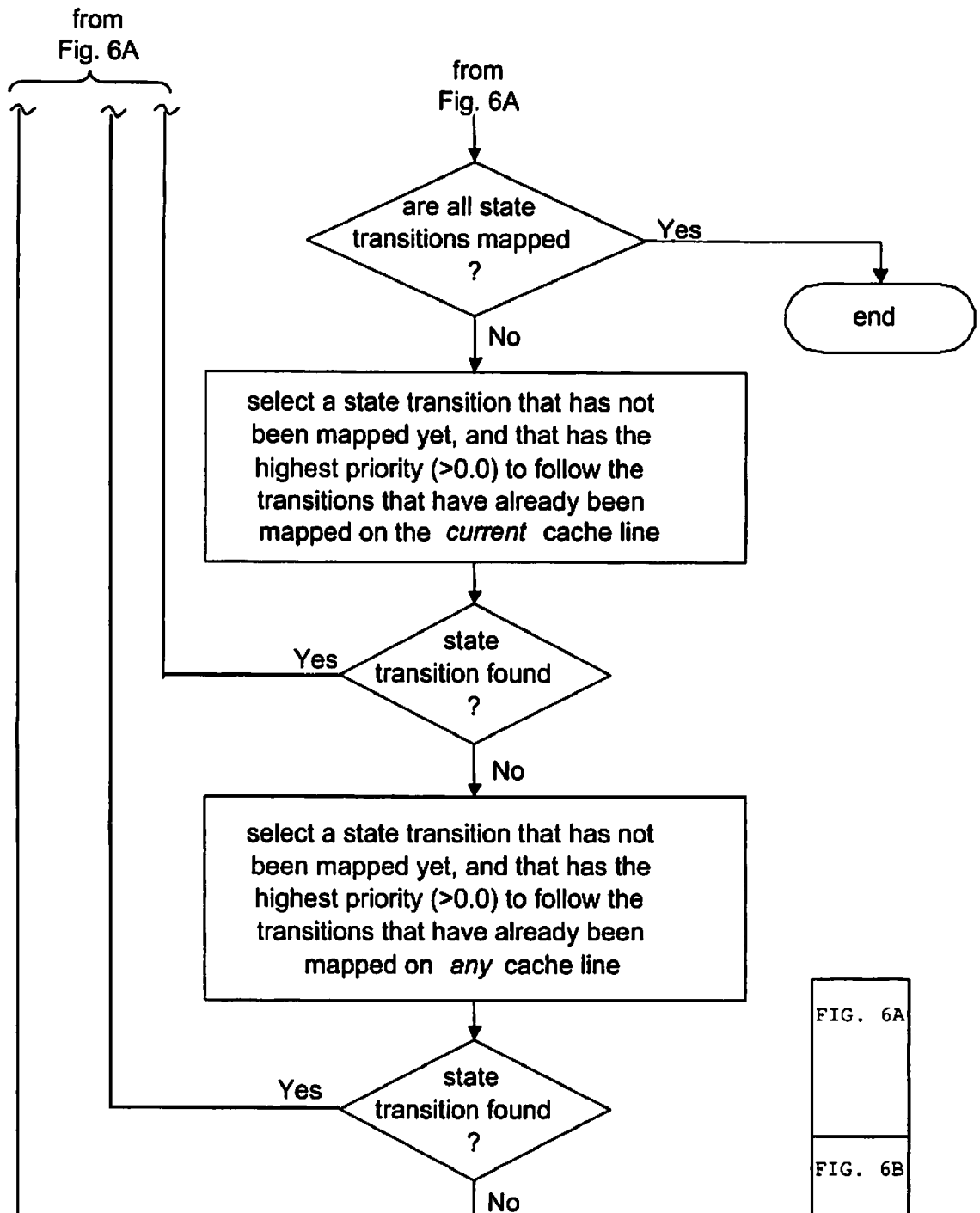
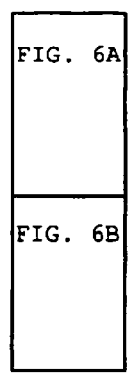
Fig. 6B
FIG. 6

METHOD AND SYSTEM FOR CHANGING A DESCRIPTION FOR A STATE TRANSITION FUNCTION OF A STATE MACHINE ENGINE

BACKGROUND OF THE INVENTION

The present invention relates to the design and implementation of state machine engines in data processing systems.

A finite state machine (FSM) is a model of behaviour composed of states, transitions and actions. A state stores information about the past, i.e., it reflects the input changes from the start to the present moment. A transition indicates a state change and is described by a condition that would need to be fulfilled to enable the transition. An action is a description of an activity that is to be performed at a given moment. A specific input action is executed when certain input conditions are fulfilled at a given present state. For example, an FSM can provide a specific output (e.g., a string of binary characters) as an input action.

An FSM can be represented using a set of (state) transition rules that describes a state transition function. State transition diagrams are used to graphically represent FSMs. Classic forms of state transition diagrams are directed graphs, where each edge is a transition between two states and each vertex is a state. The inputs are signified on each edge.

Controllers in a broad spectrum of devices and systems are often based on state machine engines that implement a FSM. Emerging trends, including programmable accelerators etc., require the operation of these devices, and consequently also the controller operation, to be configurable and/or programmable. For this purpose, programmable state machine engines are used.

An example of such a programmable accelerator is the ZuXA accelerator concept described in a paper co-authored by one the inventors: Jan van Lunteren et al, "XML Accelerator Engine", Proc. of First International Workshop on High Performance XML Processing, 2004. ZuXA is based on the BaRT-based FSM (B-FSM) technology. BaRT (Balanced Routing-Table Search) is a specific hash table lookup algorithm described in a paper of one of the inventors: Jan van Lunteren, "Searching Very Large Routing Tables in Wide Embedded Memory", Proc. of GLOBECOM '01, pp. 1615-1619.

A ZuXA controller can be used to improve the processing of XML (eXtensible Markup Language) code. It is fully programmable and provides high performance in combination with low storage requirements and fast incremental updates. Especially, it offers a processing model optimized for conditional execution in combination with dedicated instructions for character and string-processing functions. The B-FSM technology describes a state transition function using a small number of state transition rules, which involve match and wildcard operators for the current state and input symbol values, and a next-state value. The transition rules are assigned priorities to resolve situations in which multiple transition rules are matching simultaneously.

FIG. 1 shows a block diagram of a subsystem of a controller comprising a state machine engine that implements a B-FSM (an FSM based on the BaRT hash table lookup operation). The transition rules are stored in a transition rule memory 10. A rule selector 11 reads rules from the rule memory 10 based on a given input vector and a current state stored in a state register 12. The transition rules stored in the rule memory 10 are encoded in the transition rule vector format shown in FIG. 2. A transition rule vector comprises a test part 20 and a result part 21. The test part 20 comprises fields for a current state 22, an input character 23 and a condition 24. The result part 21 comprises fields for a mask 25, a next state 26, an output 27, and a table address 28.

In a ZuXA controller the input to the rule selector 11 consists of a result vector provided by a component called instruction handler, in combination with a general-purpose input value obtained, for example, from an input port. In each cycle, the rule selector 11 will select the highest-priority transition rule that matches the current state stored in the state register 12 and the input vector. The result part 21 of the transition rule vector selected from the transition rule memory 10 will then be used to update the state register 12 and to generate an output value. The output value includes instructions that are dispatched for execution by the instruction handler component. The execution results are provided back to the rule selector 11 and used to select subsequent instructions to be executed by the instruction handler component as described above.

FIG. 3 shows a more detailed block diagram of the state machine engine of FIG. 1. The transition rule memory 10 contains a transition rule table 13 that is implemented as a hash table. Each hash table entry of the transition rule table 13 comprises several transition rules that are mapped to the hash index of this hash table entry. The transition rules are ordered by decreasing priority within a hash table entry. An address generator 14 extracts a hash index from bit positions within the state stored in the state register 12 and input vectors that are selected by a mask stored in a mask register 15. In order to obtain an address for the memory location containing the selected hash table entry in the transition rule memory 10, this index value will be added to the start address of the transition rule table in this memory. This start address is stored in a table address register 16.

The function of the rule selector 11 is based on the BaRT algorithm, which is a scheme for exact-, prefix- and ternary-match searches. The BaRT search operation involves comparing the N=4 transition rule entries 30, 31, 32, 33 contained in each hash table entry 0 and 1 in parallel with the search key. The search key is build from the actual values of the state register 12 and the input vector, while taking potential "don't care" conditions indicated by the condition field 24 of the transition rule entries into account. The first matching transition rule vector is then selected and its result part field 21 is selected to become the search result.

Especially, in a ZuXA controller the search result can be used to generate an instruction vector for the instruction handler component that provides processing results back to the state machine engine as part of an input vector. The instructions contained in the instruction vector can be used for simple (and fast to be implemented) functions that run under tight control of the state machine engine. Examples are character—and string processing functions, encoding, conversion, searching, filtering, and general output generating functions.

Compared to other applications in which state machine engines are used, controllers embedded in larger systems often involve a much wider input vector to the state machine engine that is comprised of "status" and result information of a multitude of logic functions and components that are controlled by the state machine engine. For example, such embedded controllers are used in computer systems to perform parsing and pattern matching operations on a given stream of network data in order to offload these tasks from the central processors. The U.S. Pat. No. 7,480,312 describes such a network traffic accelerator system and method.

For usual pattern-matching and parsing applications on the other hand, the input to the state machine engine often consists only of a single character in each clock cycle, a single byte in case of standard encodings such as ASCII (American Standard Code for Information Interchange). Support of wider input vectors as needed for a network traffic accelerator system, for example 32 bits, is much harder to implement in an efficient way at high processing rates, than to implement a state machine engine which processes input vectors consisting of only 8 bits, mainly because of the much larger set of possible input values that can occur. Due to the high clock frequencies of today's processors it is therefore a challenging task to provide a ZuXA controller implementation for the use as a network traffic accelerator in computer systems with such high speed processors.

In practice, however, often only a subset of the entire set of possible input values will be used, and consequently, the state machine engine design can be optimized for that given subset. One example is to use a hash function for selecting state transitions, which only considers certain groups of bits from the input value. Another example would be to assume that from most states (e.g., 95%), at most a certain number (e.g., 4) of transitions can be made, each labeled with a certain input value.

A similar approach related to logic synthesis methods is described in a technical disclosure published as IPCOM121980D. Logic synthesis is a process by which an abstract form of desired hardware logic circuit behaviour (typically at the so-called register transfer level or behavioural level) is turned into a circuit design implementation in terms of logic gates. Common examples of this process include synthesis of hardware description languages (e.g., VHDL or Verilog). In a logic synthesis tools chain, an FSM compiler is used to process a state transition table (or other specified input formats) and derives a sum-of-products equation for each output and for each bit of the storages (e.g., latches) used to represent the state of an FSM.

Since it is not possible for a simple FSM compiler alone to determine if a particular FSM contains sub-paths of a timing critical path in the circuit design implementation, but this information is usually known to the logic designer, the logic designer can provide this information to the FSM compiler. The FSM compiler can then use this information to reorder the sum-of-products equations to reduce the delay of the critical sub-path based on the designer's "coaching".

There exist several others of these examples corresponding to a variety of different techniques that can be used to implement a state machine engine. In all cases the subset of the possible input values is specified by certain constraints for the set of possible input values. It is therefore beneficial to optimize the state machine engine implementation for that given subset of possible input values, enabling an efficient and fast implementation, rather than trying to cover all possible input values, resulting in an expensive and slow implementation. However, the problem that arises in this case is that in very few cases, some of the input values, or combinations of input values, can occur that are not supported by the implementation.

SUMMARY OF THE INVENTION

It is therefore an embodiment of the present invention to provide a method for the implementation of state machine engines that is improved over the prior art and a corresponding computer program and computer program product.

The advantages of another embodiment are achieved by a method of optimizing a state transition function specification for a state machine engine based on a probability distribution for the state transitions. For many state machine engines, it is possible to derive such a probability distribution and exploit that for improving the overall performance.

A probability distribution can be provided either by input from a user of a state machine engine compiler (i.e., by a designer, or programmer) or by running simulations or emulations for state machine engines with realistic stimuli, or by using any suitable model for the state transition function. For a program comprised of a state transition function specification, the user input or simulation results can consist of a (relative) probability distribution indicating the chance that certain sequences of state transitions will be taken. For example, the transition rules that are part of the program for handling errors and other exceptional situations should less likely be used than the transition rules that implement the "standard mode" of operation.

The probability distribution is then used to create an order of the state transitions that is optimized for their use by the state machine engine.

In another embodiment of the invention, a B-FSM state machine engine accesses a transition rule memory using a processor cache. In this embodiment, the invention allows to improve the cache hit rate by exploiting the probability distribution (specifying which sequences of state transitions are more likely to be used than others) for determining which transition rules will be mapped on a given cache line (that corresponds to hash table entry), as well as how new cache lines will be prefetched into the processor cache. The state transitions are ordered such that they can be distributed to the cache lines in order to optimize the speed of their processing.

In yet another particular embodiment of the invention, a B-FSM state machine engine comprises a transition rule memory attached via a bus. This bus has a bus width that is less than the width of the hash table entry that the B-FSM state machine engine accesses in each cycle for retrieving a total of N transition rules. The N transition rules that comprise the hash table entry will be accessed in a burst mode, in which the N transition rules are transferred over the bus in multiple cycles. As a result, the transition rules will be received in a certain order over the bus. Because the comparison of the actual state and input values against each of the transition rules can immediately start after each of these rules has been received, the invention allows to improve the overall performance as the transition rule that is most likely to be selected is be the first to be transferred over the bus as part of the burst access. The state transitions are ordered such that they can be distributed to the data segments within the associated cache lines in order to optimize the speed of their processing.

The invention can also be combined with a method of checking a state transition function specification created by a designer, and resolving any constraint conflicts in an interactive way.

BRIEF DESCRIPTION OF THE DRAWINGS

The present invention and its advantages are now described in conjunction with the accompanying drawings.

It is to be noted, however, that the appended drawings illustrate only example embodiments of the invention, and are therefore not considered limiting of its scope, for the invention may admit to other equally effective embodiments.

DETAILED DESCRIPTION

A preferred embodiment of the present invention is used in conjunction with a ZuXA controller.

Probability Distributions

A probability distribution, as used in the present invention, is a function that represents the probability that a specific state transition will be followed by other state transitions. Such a probability distribution can be determined automatically through simulations of state machine engines for a given set of input stimuli by the following steps:

Step D1: Storing all sequences of state transitions for the given input stimuli, whereby all state transitions that are identical to the immediately preceding state transition within the sequence, are ignored;

Step D2: For each stored state transition, determining the next state transition in all sequences (the follow-on state transitions), and counting the frequencies of the different follow-on state transitions;

Step D3: Determining a probability distribution by dividing the frequency count of each follow-on state transition by the accumulated frequency count of all possible follow-on state transitions.

Figure 4:
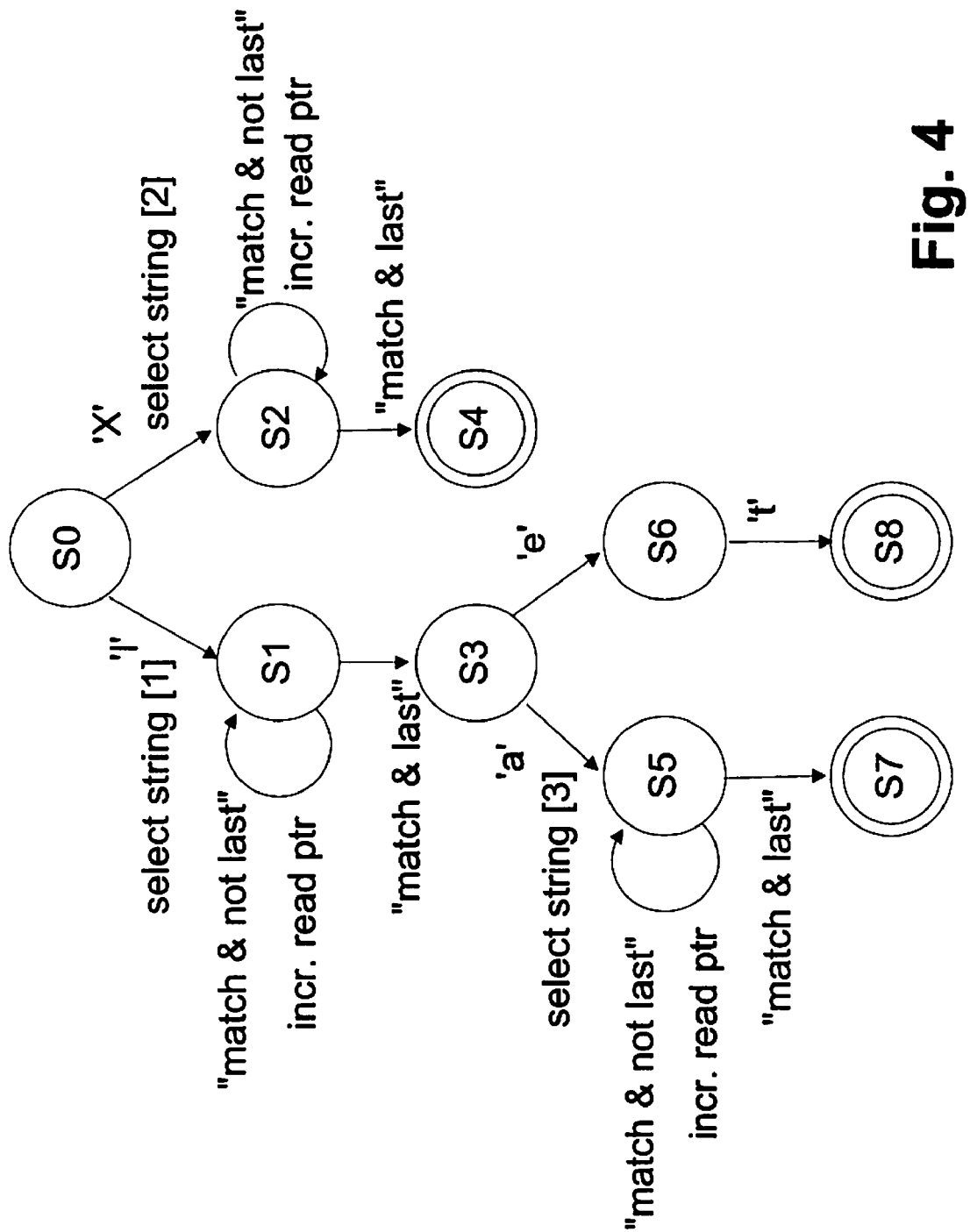
FIG. 4: Is a state transition diagram.
Figure 5:
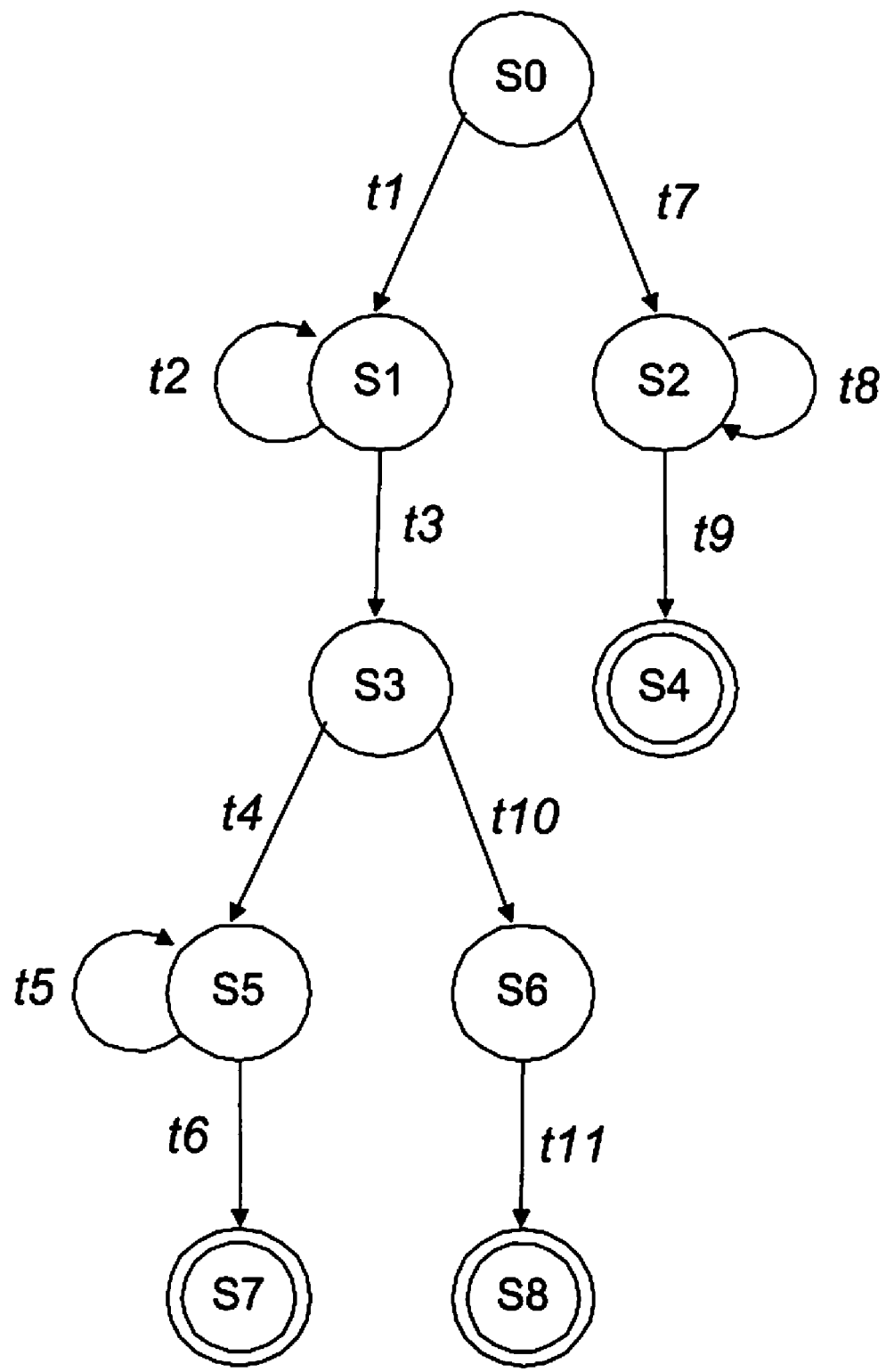
FIG. 5: Is a state transition diagram.

This probability distribution represents the chance that a given state transition will be followed by other state transitions. These three steps are now explained for a ZuXA controller that tests an input character stream against the following three character strings "International Business Machines", "Internet", and "XML Parser". These tests can be described by a set of state transition rules that relate to the example state transition diagram shown in FIG. 4, which describes a specific state transition function for the state machine engine of the ZuXA controller. In this way, this set of transition rules serves as a program for the state machine engine of the ZuXA controller. In the step D1 the state transitions are assigned an identifier as shown in FIG. 5.

This example set of transition rules uses the following three strings:

string[1]="ntern"

string[2]="ML Parser"

string[3]="tional Business Machines"

The input to the state machine engine consists of a dedicated input character from the input character stream and the processing results received from the instruction handler component of the ZuXA controller. As a result of a state transition, the state machine engine will dispatch certain instructions to the instruction handler component as an output. The state machine engine of the ZuXA controller will perform state transitions based on the transition rules selected by the rule selector 11 (see FIG. 3) from the transition rule memory 10. This scenario is also described as a state transition that is taken from a (current) state to another state.

In order to simplify the description, it is assumed that the input character stream consists of the following sequence of strings: "Internet", "International Business Machines", "Internet", "Internet", "XML Parser", and "Internet". In case that the input character stream contains strings different from one of the strings "Internet", "International Business Machines", and "XML Parser", other state transitions and associated actions (especially instructions for the instruction handler component) would be used that are not shown in the state transition diagrams of FIG. 4 and FIG. 5.

The initial state of the state transition diagrams is S0. In case the input character stream starts with an 'I' character, the next state is S1 and the instruction handler component performs a "select string[1]" operation as a result of the state transition. This operation will position a read pointer ptr at the first character of string[1] in a string memory, a memory used to store the input character stream. This state transition is assigned the identifier t1. In case the input character stream starts with an 'X' character, the next state is S2 and the instruction handler component performs a "select string[2]" operation as a result of the state transition. This state transition is assigned the identifier t7.

Figure 2:
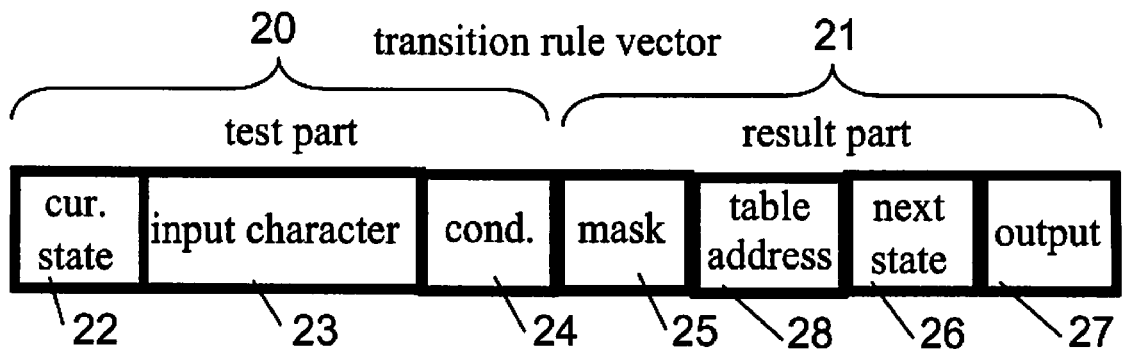
FIG. 2: Is a block diagram of a transition rule vector format.

The input characters 'I' and 'X' are compared by the rule selector 11 with values stored in the input character field 23 of the test part 20 of the transition rule vectors (see FIG. 2) stored in the transition rule memory 10. Based on the current state as stored in the state register 12 and the input from the instruction handler component, the rule selector 11 will select the transition rule vector from the transition rule memory 10 for which the test part 20 matches. For this selection process also conditions provided by the instruction handler component will be taken into consideration. The operations "select string [1]" and "select string[2]" are taken by the rule selector 11 from the output field 27 of the result part 21 of the matching transition rule vector and provided as output of the state machine engine. The next state of the state machine engine is taken from the next state field 26 and stored in the state register 12 by the rule selector 11, which updates the content of the mask register 15 by the content of the mask field 25.

The state S1 involves two conditions denoted as "match & not last" and "match & last", that are stored in the condition field 24 of the test part 20 of a transition rule vector. The "match & not last" condition evaluates to true if the input character matches the current character referred by the read pointer ptr. The "match & last" condition evaluates to true if the read pointer ptr refers to the last character of the selected string in the string memory and the input character field matches this last character.

From state S1 a state transition to S1 is taken when the condition "match & not last" is fulfilled. In that case the read pointer ptr is incremented to refer to the next input character in the selected string string[1]. This state transition is assigned the identifier t2. In case the condition "match & last" is fulfilled, the state machine engine performs a state transition from state S1 to the state S3. This state transition is assigned the identifier t3.

From state S2 a state transition to S2 is taken when the condition "match & not last" is fulfilled. In that case the read pointer ptr is incremented to refer to the next input character in the selected string string[2]. This state transition is assigned the identifier t8. In case the condition "match & last" is fulfilled, the state machine engine performs a state transition from state S2 to the state S4, which is a terminal state, from which no state transitions to other states exist. This state transition is assigned the identifier t9.

From state S3 a state transition to the state S6 is taken, when the input character is an 'e'. This state transition is assigned the identifier t10. From state S6 a state transition to the terminal state S8 is taken, when the input character is a 't'. This state transition is assigned the identifier t11. When the input character is an 'a', then a state transition from state S3 to the state S5 is taken and the instruction handler component performs a "select string[3]" operation as a result of the state transition. This operation will position a read pointer ptr at the first character of string[3] in the string memory. This state transition is assigned the identifier t4.

From state S5 a state transition to state S5 is taken, when the condition "match & not last" is fulfilled. In that case the read pointer ptr is incremented to refer to the next input character in the selected string string[3]. This state transition is assigned the identifier t5. In case the condition "match & last" is fulfilled, the state machine engine performs a state transition from state S5 to the terminal state S7. This state transition is assigned the identifier t6. The state machine engine will reach the terminal states S7, S8, and S4 for the strings "International Business Machines", "Internet", and "XML Parser" respectively.

For the example input character stream, the following sequences of state transitions are stored as part of the step D1:

Sequence 1 ["Internet"]: (t1, t2, t3, t10, t1)

Sequence 2 ["International Business Machines"]: (t1, t2, t3, t4, t5, t6)

Sequence 3 ["Internet"]: (t1, t2, t3, t10, t11)

Sequence 4 ["Internet"]: (t1, t2, t3, t10, t11)

Sequence 5 ["XML Parser"]: (t7, t8, t9)

Sequence 6 ["Internet"]: (t1, t2, t3, t10, t11)

In the step D2, for each state transition the number of the different follow-on state transitions is determined and counted. For example, for the sequence 1 the initial state transition t1 is followed by one state transition t2, which is followed by one state transition t3, and so on. By determining, storing and processing all the different sequences of state transitions, the following Table 1 can be derived (and stored in a computer memory for example). In this Table 1 a dummy transition nil is used to count the initial transitions, which "follow" the nil transition.

TABLE 1

| | follow-on transition counts | | | | | | | | | | |
|---|---|---|---|---|---|---|---|---|---|---|---|
| transitions | t1 | t2 | t3 | t4 | t5 | t6 | t7 | t8 | t9 | t10 | t11 |
| nil | 5 | 0 | 0 | 0 | 0 | 0 | 1 | 0 | 0 | 0 | 0 |
| t1 | 0 | 5 | 0 | 0 | 0 | 0 | 0 | 0 | 0 | 0 | 0 |
| t2 | 0 | 0 | 5 | 0 | 0 | 0 | 0 | 0 | 0 | 0 | 0 |
| t3 | 0 | 0 | 0 | 1 | 0 | 0 | 0 | 0 | 0 | 4 | 0 |
| t4 | 0 | 0 | 0 | 0 | 1 | 0 | 0 | 0 | 0 | 0 | 0 |
| t5 | 0 | 0 | 0 | 0 | 0 | 1 | 0 | 0 | 0 | 0 | 0 |
| t6 | 0 | 0 | 0 | 0 | 0 | 0 | 0 | 0 | 0 | 0 | 0 |
| t7 | 0 | 0 | 0 | 0 | 0 | 0 | 0 | 1 | 0 | 0 | 0 |
| t8 | 0 | 0 | 0 | 0 | 0 | 0 | 0 | 0 | 1 | 0 | 0 |
| t9 | 0 | 0 | 0 | 0 | 0 | 0 | 0 | 0 | 0 | 0 | 0 |
| t10 | 0 | 0 | 0 | 0 | 0 | 0 | 0 | 0 | 0 | 0 | 4 |
| t11 | 0 | 0 | 0 | 0 | 0 | 0 | 0 | 0 | 0 | 0 | 0 |

In the step D3, a probability distribution is derived from Table 1, which represents for each transition the probability that it is followed by a specific other transition. For example, in 5 out of 1+5=6 cases, which corresponds to a probability of 0.83, the initial transition is transition t1, and that in the remaining 1 out of 6 cases, corresponding to a probability of 0.17 it is transition t7. In a similar way, the other probabilities can be computed. The following Table 2 (which can be stored in a computer memory for example) contains the corresponding list of probabilities, which represents the associated probability distribution.

TABLE 2

| | follow-on transition probabilities | | | | | | | | | | |
|---|---|---|---|---|---|---|---|---|---|---|---|
| transitions | $T_1$ | $t_2$ | $t_3$ | $t_4$ | $t_5$ | $t_6$ | $t_7$ | $t_8$ | $t_9$ | $t_{10}$ | $t_{11}$ |
| nil | 0.83 | 0 | 0 | 0 | 0 | 0 | 0.17 | 0 | 0 | 0 | 0 |
| t1 | 0 | 1.0 | 0 | 0 | 0 | 0 | 0 | 0 | 0 | 0 | 0 |
| t2 | 0 | 0 | 1.0 | 0 | 0 | 0 | 0 | 0 | 0 | 0 | 0 |
| t3 | 0 | 0 | 0 | 0.2 | 0 | 0 | 0 | 0 | 0 | 0.8 | 0 |
| t4 | 0 | 0 | 0 | 0 | 1.0 | 0 | 0 | 0 | 0 | 0 | 0 |
| t5 | 0 | 0 | 0 | 0 | 0 | 1.0 | 0 | 0 | 0 | 0 | 0 |
| t6 | 0 | 0 | 0 | 0 | 0 | 0 | 0 | 0 | 0 | 0 | 0 |
| t7 | 0 | 0 | 0 | 0 | 0 | 0 | 0 | 1.0 | 0 | 0 | 0 |
| t8 | 0 | 0 | 0 | 0 | 0 | 0 | 0 | 0 | 1.0 | 0 | 0 |
| t9 | 0 | 0 | 0 | 0 | 0 | 0 | 0 | 0 | 0 | 0 | 0 |
| t10 | 0 | 0 | 0 | 0 | 0 | 0 | 0 | 0 | 0 | 0 | 1.0 |
| t11 | 0 | 0 | 0 | 0 | 0 | 0 | 0 | 0 | 0 | 0 | 0 |

The probability distribution of Table 2 can be determined using the steps D1, D3 for any simulation, emulation, or other suitable model of a state machine or the associated state transition function. Besides that, this distribution can provided manually by a user of a computer for example.

Hash Functions And Processor Caches

In computer science, a hash table is a data structure that can be used to associate keys with values: In a hash table lookup operation the corresponding value is searched for a given search key. For example, a person's phone number in a telephone book could be found via a hash table search, where the person's name serves as the search key and its phone number as the value. Caches, associative arrays, and sets are often implemented using hash tables. Hash tables are very common in data processing and implemented in many software applications and many data processing hardware implementations.

Hash tables are typically implemented using arrays, where a hash function determines the array index for a given key. The key and the value (or a pointer to their location in a computer memory) associated to the key is then stored in the array entry with this array index. This array index is called the hash index. In the case that different keys are associated to different values but these different keys have the same hash index, this collision is resolved by an additional search operation. For example, a linear search in a linked list is performed, where a pointer to the location of the linked list in a computer memory is stored in the array entry, and an entry in the list contains a key-value pair. Each entry in the list is then tested for containing the search key. This method is called chaining.

Another method that can have advantages in certain situations is open addressing, where collisions are resolved by probing: alternate entries in the hash table array are tested in a certain sequence, the probe sequence. Well-known probing sequences include linear probing, quadratic probing, and double hashing. The proportion of entries in the hash table array that are used in called the load factor. The load factors are normally limited to 80% (also when using chaining). A poor hash function can lead to a bad hash table lookup performance even at very low load factors by generating significant clustering. Hence a large portion of computer memory space reserved for the hash table array is unused.

A hash function is well suited for a certain scenario when the chances for collisions are rather small. A good choice for a hash function depends on the type of possible keys. Hash tables with well-suited hash functions often have a pseudo-random distribution of the values in the hash table array, which leads to access patterns to the hash table array that are hard to predict.

In computer science, a cache is a collection of data duplicating original values, where the original data is expensive (usually in terms of access time) to fetch or compute relative to reading the cache. Once the data is stored in the cache, future use can be made by accessing the cached copy, so that the average access time is lower. In general, a cache is a pool of entries. Each entry has a datum, which is a copy of the datum in some backing store. Each entry also has a tag, which specifies the identity of the datum in the backing store of which the entry is a copy. If an entry can be found with a tag matching that of the desired datum, the datum in the entry is used instead. This situation is known as a cache hit. When the cache is consulted and found not to contain a datum with the desired tag, this is known as a cache miss. In the case of a cache miss, most cache implementations allocate a new entry, which comprises the tag just missed and a copy of the data from a backing store.

A processor cache is a cache implementation managed entirely by hardware. It comprises a smaller and faster memory than the main memory used by the processor. It stores copies of the data from the most frequently used main memory locations (a number of main memory cells with consecutive addresses in the main memory). An entry in the processor cache is called a cache line. Each cache line has a tag, which contains the address of the beginning of the memory location in the main memory. When a processor is reading or writing a location in main memory, it first checks whether that memory location is in the cache. This is accomplished by comparing the address of the beginning of the memory location to all tags in the cache that might contain that address.

When using a processor cache, the processor performance is improved by the cache locality principle: In most cases main memory references made in any short time interval tend to use only a small fraction of the total memory. When a main memory location is referenced, it and some of its neighbors are brought from the large slow main memory into the faster processor cache, so that the next time it is used it can be accessed quickly. Except for the need to set up certain parameters and the experience of variable performance penalties in case of cache misses, the operation of processor caches is transparent to any software executed by the processor.

A hash table lookup operation executed by a processor typically consists of the following sequential steps:
  i) S1: calculate a hash index based on the search key;
  ii) S2: add this hash index to the start address of the hash table entry at the calculated main memory address;
  iii) S3: access the selected hash table entry at the calculated main memory address;
  iv) S4a: compare the hash table entry that has been retrieved from the main memory with the search key in order to determine if there is a match;
  v) S4b: in case of a match, select the hash table entry as the search result.

In case of a mismatch, further steps are required. If the main memory is complemented by a processor cache, then step S3 is replaced by the following steps:

i) S3a: check if the calculated main memory address is stored in the processor cache by comparing this address with the cache tag(s);
  ii) S3b: in case of a cache hit, retrieve the data from the processor cache; in case of a cache miss, retrieve the data from the main memory instead.

Processor Cache Performance Improvement

A ZuXA controller uses the B-FSM technology, which employs in the rule selector 11 the BaRT hash function to select, based on the current state and input values, the state transition that will be executed in a given cycle of the state machine engine. The BaRT hash function has the property that the maximum number of collisions for any hash index can be limited by a configurable bound P. The value of P is based on the main memory (the transition rule memory 10) access granularity, typically the size of a processor cache line, to ensure that all collisions for a given hash index can be resolved by a single main memory access and by at most P comparisons. Consequently, each hash table entry will contain P state transition rules, and will comprise one single cache line.

The B-FSM algorithm can distribute the state transition rules in various ways over the hash table entries, and consequently, over the cache lines (upon which these hash table entries are mapped), by extracting the hash index from various bit positions (which is achieved by using various index masks) and by using various state encodings. The function that generates the data structure, which includes performing this mapping, is called the B-FSM compiler. The result of this distribution step is a specific ordering of the state transitions, in which a state transition is associated to a cache line. Even further, the state transitions are associated to data segments within the associated cache line.

The expression "mapping state transitions on a cache line" is used to denote the scenario that state transitions are written on consecutive locations in main memory (i.e., locations with consecutive addresses), which are retrieved from main memory and stored as a single line in the cache during normal operation.

A B-FSM compiler implementation in accordance with the present invention applies an intelligent (and complex) scheme to efficiently realize these mappings. Another B-FSM compiler implementation in accordance with the present invention, simply tries all possible combinations of state encodings and index mask values until a desired mapping of state transitions over cache lines has been achieved. Both B-FSM compiler implementations can realize any mapping of state transitions upon cache lines, and consequently, group any combination of P state transitions within the same cache line, with P being the number of state transitions that fit in a single cache line.

For the preferred embodiment of the invention, an existing B-FSM compiler for a ZuXA controller is extended to use probability distribution information obtained in a separate step, for the determination of the way in which state transitions are mapped and grouped within cache lines in order to improve the performance of a state machine engine. First an example will be discussed in which the probability distribution information is neglected by a B-FSM compiler, and all state transitions shown in FIG. 5 are mapped on different cache lines. In that case, a total of 6 cache lines would need to be retrieved from the main memory if the input string were "International Business Machines", 5 cache lines if it were "Internet" and 3 cache lines if it were "XML Parser", assuming that the corresponding transitions were not available in the processor cache.

Compared to this worst-case scenario, the extended B-FSM compiler can improve the performance of the state machine engine by considering the probability distribution information, through iteration of the following steps until all state transitions have been mapped on cache lines:

Step C1: Selecting a new empty cache line, this becomes the current cache line;

Step C2: Selecting a state transition that has not been mapped yet;

Step C3: If the current cache line is entirely filled then selecting the next empty cache line, this becomes the new current" cache line;

Step C4: Mapping the selected state transition on the current cache line;

Step C5: Selecting a state transition that has not been mapped yet, which has the highest probability to follow the state transition(s) that already have been mapped on the current cache line;

Step C6: If a state transition is found (i.e., probability larger than zero) then go to step C3, otherwise go to step C7.

Step C7: Selecting a state transition that has not been mapped yet, which has the highest probability to follow the state transition(s) that already have been mapped on any cache lines;

Step C8: If a state transition is found (i.e., probability larger than zero) then go to step C3, otherwise go to step C2.

Figure 6A:
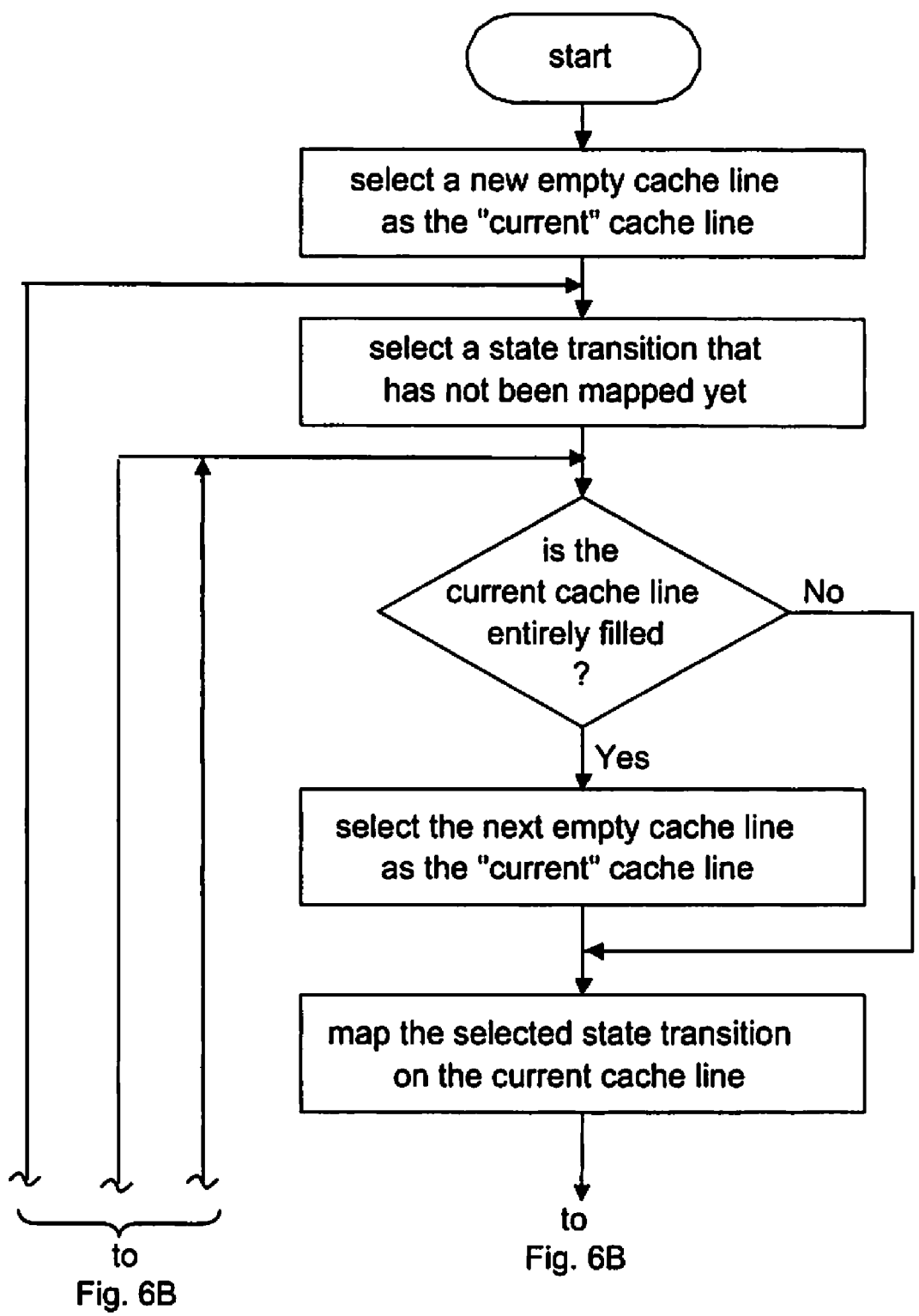
FIG. 6: Is a flow chart illustrating a method in accordance with the present invention.

The above steps are represented in a flow chart in FIG. 6. Although basically any state transition can be selected in step C2 at random that has not been mapped, preferably a state transition is selected which resides in a long state transition sequence as determined in step D1 for obtaining a probability distribution, and which is nearest to the initial state.

This will now be illustrated using the example state transition diagram shown in FIG. 5 and the corresponding probability distribution information contained in Table 2. It is assumed that each cache line can store P=4 state transitions. This results in the following sequence of the steps C1 to c8:

Step C1: A new empty cache line $c_0$ is selected, which becomes the current cache line:
  i) current cache line $c_0$: x x x x
  ii) ('x' represents an empty location in the cache line)

Step C2: Transition t1 is selected; it is in the longest sequence 2 (corresponding to "International Business Machines") and nearest to the initial state.

Step C3: The current cache line is not entirely filled. No action needed.

Step C4: The selected transition t1 is mapped on the current cache line c.
  i) current cache line $c_0$: t1 x x x Steps C5, C6: Transition t2 is selected which has a probability 1.0 to follow transition t1 that is already mapped on the current cache line $c_0$. Go to step C3.

Step C3: The current cache line is not entirely filled. No action needed.

Step C4: The selected transition t2 is mapped on the current cache line $c_0$.
  i) current cache line $c_0$: t1 t2 x x Steps C5 C6: Transition t3 is selected which has the highest probability (1.0) to follow transition t2 that is already mapped on the current cache line $c_0$. Go to step C3.

Step C3: The current cache line is not entirely filled. No action needed.

Step C4: The selected transition t3 is mapped on the current cache line $c_0$.)
  i) current cache line $c_0$: t1 t2 t3 x Steps C5. C6: Transition t10 is selected which has the highest probability 0.80 to follow a transition (t3) that is already mapped on the current cache line $c_0$. Go to step C3.

Step C3: The current cache line is not entirely filled. No action needed.

Step C4: The selected transition t10 is mapped on the current cache line $c_0$.)
  i) current cache line $c_0$: t1 t2 t3 t10

Steps C5. C6: Transition t11 is selected which has the highest probability 1.0 to follow a transition (t10) that is already mapped on the current cache line $c_0$. Go to step C3.

Step C3: The current cache line is entirely filled. The next empty cache line c1 is selected, which becomes the new current cache line:
  i) mapped cache lines $c_0$: t1 t2 t3 t10
  ii) current cache line $c_1$: x x x x Step C4: The selected transition t11 is mapped on the current cache line $c_1$.
  i) mapped cache lines $c_0$: t1 t2 t3 t10
  ii) current cache line $c_1$: t1 t11 x x x Steps C5, C6: No transition is found that has a probability>0.0 to follow a transition that is already mapped on the current cache line $c_1$. Go to step C7.

Steps C7, C8: Transition $t_4$ is selected which has the highest probability 0.2 to follow a transition ($t_3$) that is already mapped on a cache line ($c_0$).

Step C3: The current cache line is not entirely filled. No action needed.

Step C4: The selected transition $t_4$ is mapped on the current cache line $c_1$.
  i) mapped cache lines $c_0$: t1 t2 t3 t10
  ii) current cache line $c_1$: t11 t4 x x Steps C5. C6: Transition $t_5$ is selected which has the highest probability 1.0 to follow a transition (t4) that is already mapped on the current cache line $c_1$. Go to step C3.

Step C3: The current cache line is not entirely filled. No action needed.

Step C4: The selected transition t5 is mapped on the current cache line $c_1$.
  i) mapped cache lines $c_0$: t1 t2 t3 t10
  ii) current cache line $c_1$: t11 t4 t5 x Steps C5, C6: Transition t6 is selected which has the highest probability 1.0 to follow a transition (t5) that is already mapped on the current cache line $c_1$. Go to step C3.

Step C3: The current cache line is not entirely filled. No action needed.

Step C4: The selected transition t6 is mapped on the current cache line $c_1$.
  i) mapped cache lines: $c_0$: t1 t2 t3 t10
  ii) current cache line: $c_1$: t11 t4 t5 t6

Steps C5, C6: No transition is found that has a probability>0.0 to follow a transition that is already mapped on the current cache line $c_1$. Go to step C7.

Steps C7, C8: No transition is found that has a probability>0.0 to follow a transition that is already mapped on any cache line. Go to step C2.

Step C2: Transition t7 is selected; it is on the longest remaining sequence 5 (corresponding to "International Business Machines") and nearest to the initial state.

Step C3: The current cache line is entirely filled. The next empty cache line C2 is selected, which becomes the new current cache line:
  i) mapped cache lines $c_0$: t1 t2 t3 t10
    i. $c_1$: t11 t4 t5 t6
  ii) current cache line $c_2$: x x x x Step C4: The selected transition t7 is mapped on the current cache line $c_2$.

i) mapped cache lines $c_0$: t1 t2 t3 t10
  i. c. $c_1$: t1 t4 t5 t6
  ii) current cache line: $c_2$: t7 x x x Steps C5, C6: Transition $t_8$ is selected which has the highest probability 1.0 to follow a transition (t7) that is already mapped on the current cache line $c_2$. Go to step C3.

Step C3: The current cache line is not entirely filled. No action needed.

Step C4: The selected transition t8 is mapped on the current cache line $c_2$.
  i) mapped cache lines $c_0$: t1 t2 t3 t10
  i. $c_1$: t11 t4 t5 t6
  ii) current cache line $c_2$: t7 t8 x x Steps C5, C6: Transition $t_9$ is selected which has the highest probability 1.0 to follow a transition (t8) that is already mapped on the current cache line $c_2$. Go to step C3.

Step C3: The current cache line is not entirely filled. No action needed.

Step C4: The selected transition $t_9$ is mapped on the current cache line $c_2$.
  i) mapped cache lines $c_0$: t1 t2 t3 t10
  i. $c_1$: t11 t4 t5 t6
  ii) current cache line $C_2$: t7 t8 t9 x Step C5: All state transitions have been mapped now on a total of three cache lines.

Figure 7:
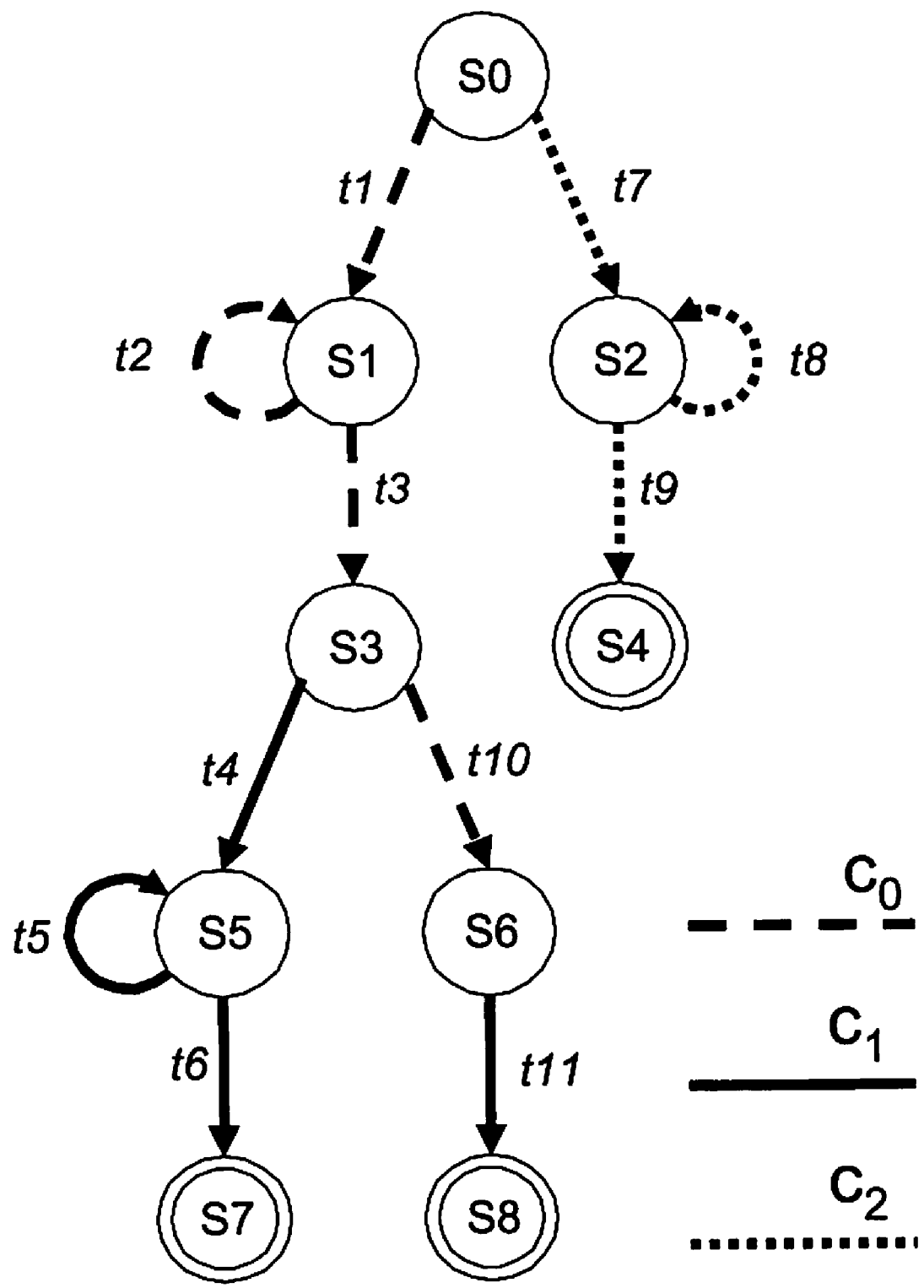
FIG. 7: Is a state transition diagram.

FIG. 7 illustrates the mapping of the state transitions to the different cache lines $c_0$, $c_1$, and $c_2$. This figure reveals that based on the given mapping, only two cache lines will need to be retrieved from the main memory if the input string were "International Business Machines", two cache lines if it were "Internet" and only one cache line if it were "XML Parser", assuming that these were not available in the processor cache. As the total main memory access latency is drastically reduced, this is a huge speedup compared to the worst-case example described before in which all state transition are mapped on different cache lines.

A method comprising the steps C1 to C8 can also be used in cases where additional constraints would exist regarding the mapping of certain state transitions on cache line, for example, due to hardware implementation or B-FSM compiler issues. These additional constraints can be met first using other methods, whereas the "gaps" in the cache lines can then be filled using a method comprising the steps C1 to C8.

Processor Cache Implementation

Figure 8:
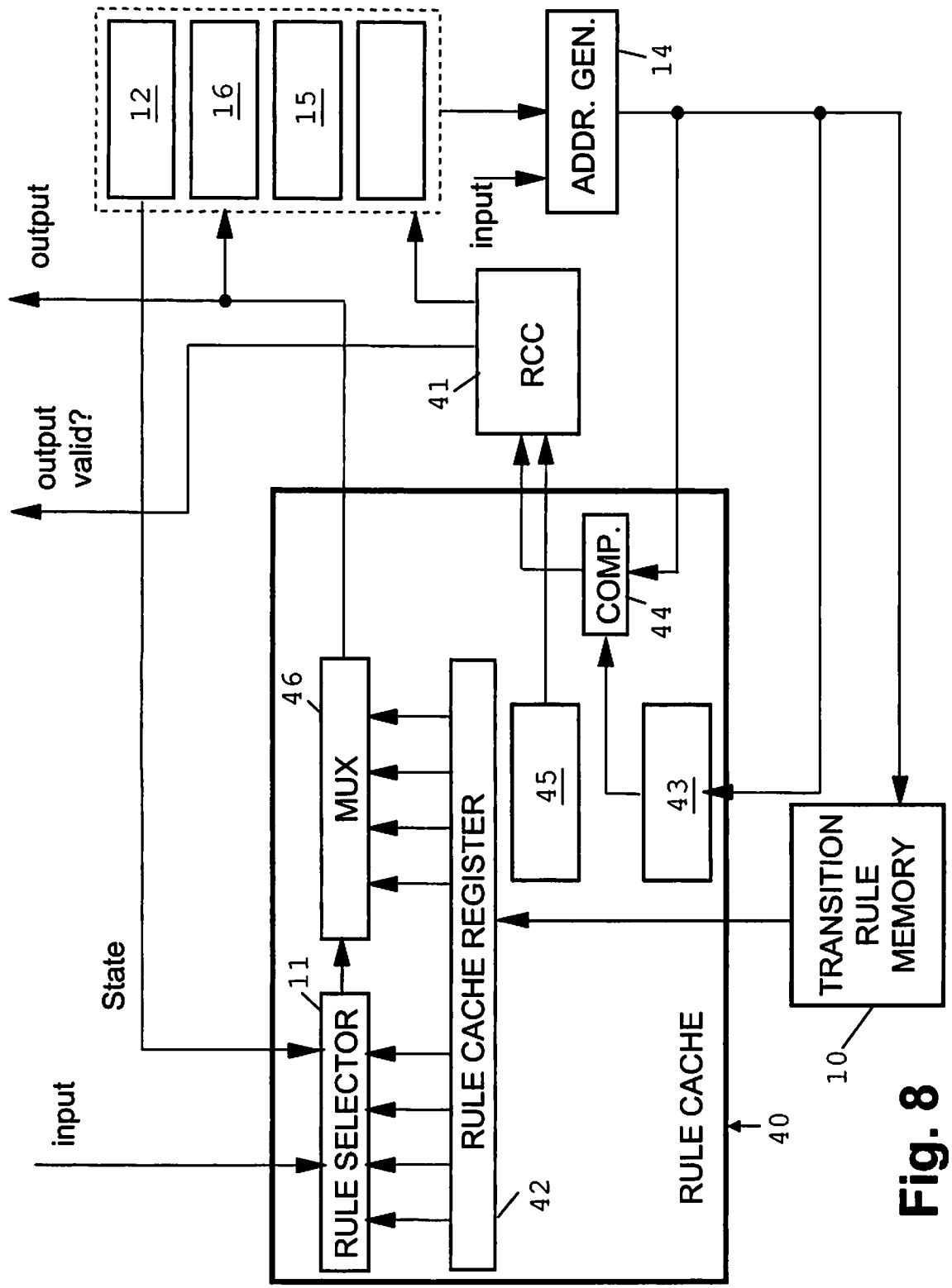
FIG. 8: Is a block diagram of a subsystem of a ZuXA controller that comprises a processor cache.

A processor cache implementation suitable for the preferred embodiment of the invention is now described. FIG. 8 shows the subsystem of a ZuXA controller from FIG. 3 extended by a processor cache 40. This processor cache serves as a rule cache 40 and is controlled by a rule cache controller (RCC) 41. The RCC 41 controls also the content that is loaded in the state register 12, the mask register 15, and the table address register 16. A rule cache register 42 comprises a single cache line comprising a copy of an entry from the transition rule table 13.

The rule cache register 42 serves as the memory of the rule cache 40. Therefore the rule cache 40 comprises a single cache line only. A cached address register 43 stores the tag for the cache line. A comparator 44 compares the tag from the cached address register 43 with the address generated by the address generator 14. A valid address register 45 stores bit flags which indicate whether the cached address register contains a valid address and whether the rule cache register 42 contains a valid entry from the transition rule table 13.

The steps of the hash table lookup operation are implemented as follows: The steps S1 and S2 of the hash table lookup operation are performed by the address generator 14. These two steps perform a calculation of the hash index and the memory address, wherein the transition rule memory 10 serves the role of the main memory and the search key is built from a set of registers and an additional input vector. The steps S3a and S3b are implemented by the comparator 44 and controlled by the RCC 41. In these two steps the main memory address is compared with the cache tag. In step S4a the hash table entry is compared with the search key. This step is implemented by the rule selector 11. Each hash table entry can contain four possible matches, which are tested in parallel against the search key. In step 4b a hash table entry is selected in case of a match. This step is implemented by a MUX 46 component, which selects the first hash table entry that matches as the search result. The content loaded to the state register 12, the mask register 15, and the table address register 16 is updated by the RCC 41 based on the search result via the MUX 46. Especially, the search result output vector can be used to generate an instruction vector for the instruction handler component.

The "address generation" function performed by the address generator 14 precedes the "rule cache controller" function performed by the RCC 41. These functions implement the sequence of steps (S1, S2, S3a, S3b). The "rule selector" function performed by the rule selector 11 precedes the "MUX" function performed by the MUX 46. These functions implement the sequence of steps (S4a, S4b). At the moment M that it has been checked that the rule cache 40 contains the desired main memory address (when the sequence of steps (S1, S2, S3a, S3b) is completed) the selected hash table entry will be selected as the search result. Due to this parallelism, the completion of the evaluation step (S1, S2, S3a, S3b) that determines if the cache line contains the desired hash table entry can therefore be considered as delayed. On the other hand the selected hash table entry was obtained through a process step comprising the sequence of steps (S4a, S4b) that can be considered as speculative.

Figure 9:
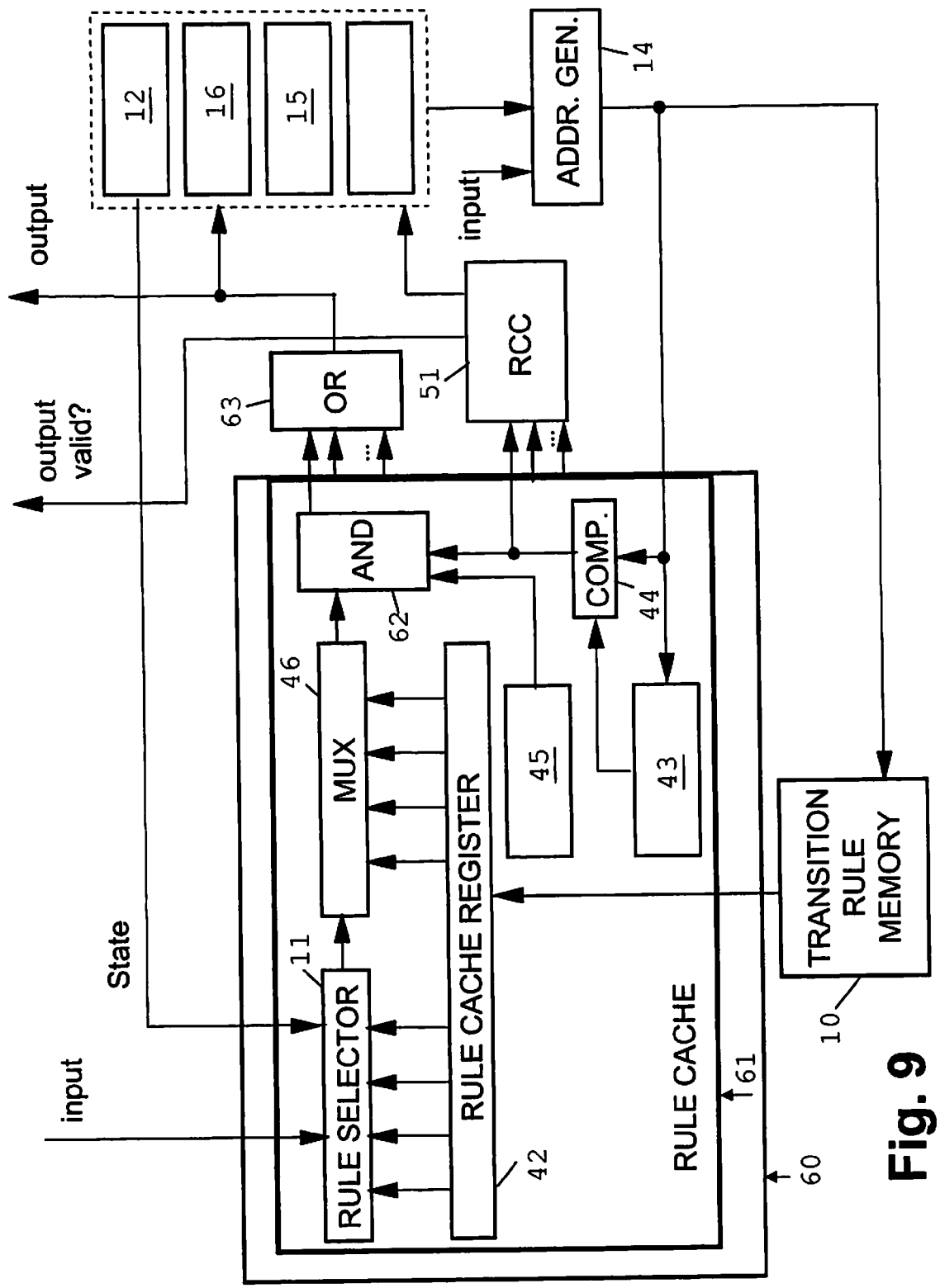
FIG. 9: Is a block diagram of a subsystem of a ZuXA controller that comprises a processor cache.

FIG. 9 shows another processor cache implementation. In this case the processor cache 60 comprises multiple cache lines. Each cache line is implemented by a rule cache 61. The rule cache 61 is derived from the rule cache 40 in FIG. 8. A RCC 51, derived from the RCC 41 in FIG. 8, is connected to each of these rule caches. For each rule cache the "speculative processing" and the "delayed evaluation" is performed in parallel and in parallel to each of the other rule caches (cache lines).

An additional AND component 62 of a rule cache 61 implements a logical AND function for output signals of the MUX 46, the comparator 44 and the valid address register 45. An OR component 63 implements a logical OR function for all the output signals of all the AND components in the different rule caches. The content of the state register 12, the state mask register 15, and the table address register 16 is updated from the output signals of the OR component 63.

The processor cache 60 exploits the fact that a cache hit can occur in at most one cache line in the following way: Each cache line (a rule cache 61) for which the "delayed evaluation" indicates that there was no cache hit, will reset its output to zero (these are the output signals of the AND component 62). This is also the case when the cache line does not contain a valid address and valid data (as indicated by the content of the valid address register 45). Consequently, only the cache line that detects a cache hit will provide "valid" data at its output signals using a simple logical OR function. These output signals are then provided by the OR component 63. The detection whether there has been a cache hit (one cache line has a match for the search key) or a cache miss (no cache line has a match for the search key) is performed by the RCC

51, which will initiate a read operation on the main memory (the transition rule memory 10) in case of a cache miss.

Prefetching and Memory Burst Access

A further and very important aspect of the invention is that a method comprising the steps C1 to C8 allows a very effective prefetching of cache lines, which is based on the same order in which the various cache lines are mapped when the method is being performed. This means that if a given cache line $c_k$ is retrieved from the main memory and stored in the processor cache, then the next cache line $c_{k+1}$ is also retrieved and stored in the processor cache, where cache line $c_{k+1}$ denotes the cache line that was processed/mapped following cache line $c_k$.

This will be illustrated using the above example, in which the input string "Internet" is the most frequently occurring input string. Processing this input string will result in the retrieval of cache line $c_0$ from the main memory, which contains the state transitions t1 to t3 and t10 as can be seen in the FIGS. 4, 5, and 7.

Because this input string is the most probable input string, the next cache line that was mapped is cache line $c_1$, which contains the remaining state transition t11 that is necessary to process the input string "Internet". By prefetching the cache lines in the same order as these are mapped, consequently the cache line that is most likely needed will be automatically prefetched. In this case, cache line $c_1$ is prefetched after cache line $c_0$. Dependent on the implementation aspects, this will typically result in an operation in which the processing performance of the input string "Internet" is only affected by the latency to retrieve a single cache line from main memory versus two times this latency, if no prefetching would be used.

Another important aspect of the invention is that the order, in which state transitions are mapped on cache lines, can be exploited to improve the state machine engine performance in systems in which the cache lines to be stored in the processor cache are retrieved from main memory using burst accesses with multiple clock cycles.

A memory device that supports a burst mode allows fetching more data in a memory access as the word size of the memory device, which is also the width of its memory bus. For example, four consecutive 64-bit words are read one after the other from a 64-bit memory device instead of only the first 64-bit word. This allows saving the time (in clock cycles) needed for the addressing of the second, third and fourth 64-bit memory word, which is usually longer as the time for the actual transfer of the data on the memory bus. For the retrieval and prefetching of cache lines from the main memory the first word for a memory burst should be the word that is needed by the processor first.

The above order of the state transition directly reflects the most probable order in which the state transitions will be used by the state machine engine for processing the input. Therefore, the state transitions should be stored in the same order in the cache lines, such that the first state transition that is mapped on each cache line will be the first to arrive over the main memory bus as part of a burst access. As a result, the most probable state transition to be used from the cache line will arrive first at the state machine logic, which allows the state machine engine to continue its operation immediately after this state transition has arrived before the remainder of the cache line has arrived as part of the burst access.

Conflict Resolution Method

Figure 10:
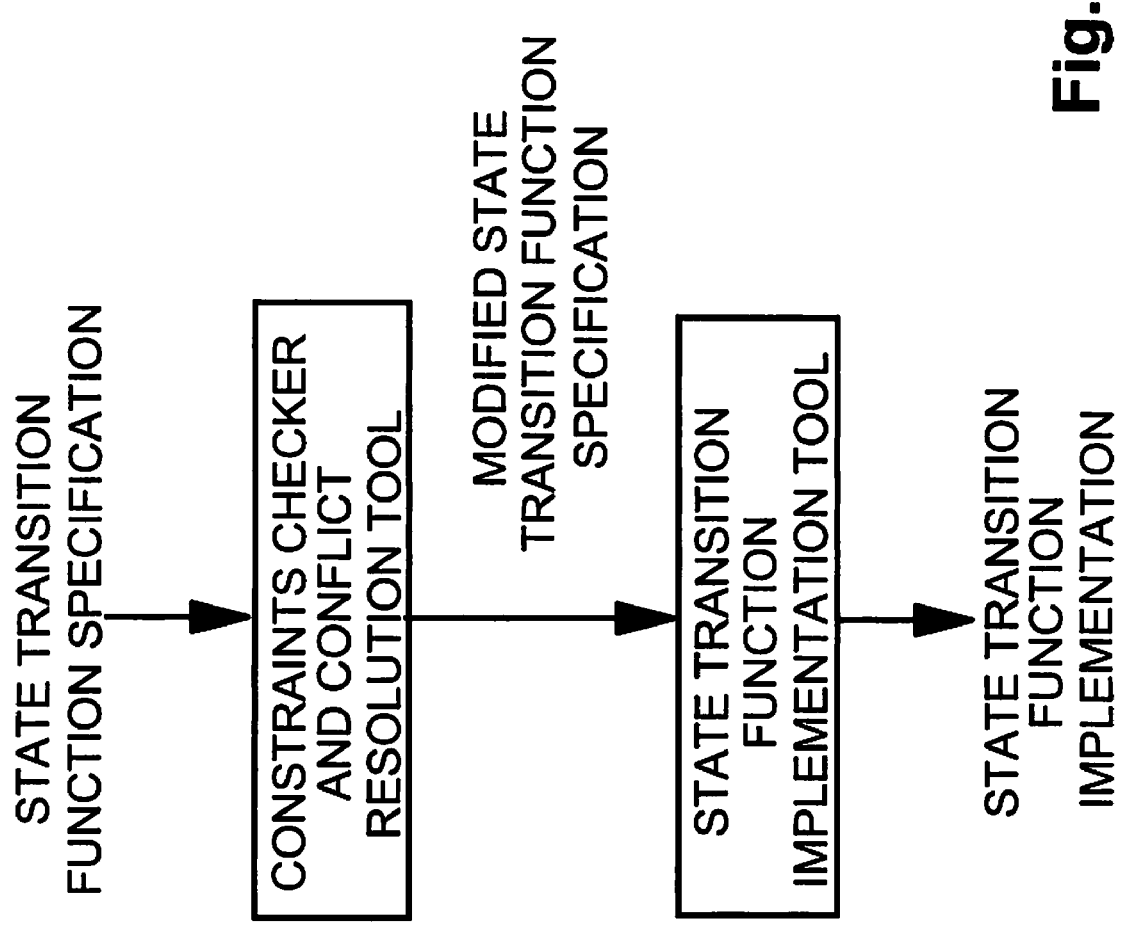
FIG. 10: Is a block diagram illustrating a data flow for a conflict resolution used in combination with the present invention.

The invention can be combined with a method of checking a state transition function specification created by a designer, and resolving any constraint conflicts in an interactive way. FIG. 10 shows a block diagram of an illustrative data flow in which a constraints checker and conflict resolution tool implementing a method in accordance to the present invention is executed before the actual implementation of the state transition function is performed by an existing state transition function implementation tool.

The input to the constraints checker and conflict resolution tool consists of a state transition function specification created by a designer, which can be described in various ways, but typically consists of a state transition table, listing all state transitions together with their originating and destination states, input and output values. An alternative description can consist for example of a list of state transition rules, involving wildcards and priorities.

The output of the constraints checker and conflict resolution tool consists of a similar state transition function specification, which meets all constraints that are imposed by the state transition function implementation tool. The latter tool will generate an implementation of the state transition function based on that specification. The actual operation of the implementation tool and corresponding constraints are dependent on the implementation technology.

For example, prior art methods for implementing non-programmable state machine engines typically use a register in combination with combinatorial logic that implements the associated state transition function. In this case, the implementation tool can generate a specification of the combinatorial logic that can be used by logic synthesis tools for the creation of a physical implementation of the state machine engine that implements the state transition function.

Prior art methods for implementing programmable state machine engines allow programming a state transition function by modifications of a RAM (Random Access Memory), for example, by storing the next states for each combination of a current state and input value in a large table, or alternatively, by applying a hash function as done in the ZuXA architecture. In this case, the implementation tool will generate a data structure that is written into the RAM.

The constraints checker and conflict resolution tool implements the following three basic subsequent steps:

A constraints checking step implemented by a method that checks the state transition function that is created by a designer, against the constraints that are imposed by the implementation technology, and detects all portions of the state transition function that do not meet these constraints (conflicting constraints).

A conflict resolution step implemented by a method that tries to determine one or more suggested ways to meet the conflicting constraints by investigating how the original state transition function can be modified such that all constraints are met.

A presentation and selection step implemented by a method of presenting to the designer in a textual and/or graphical way:
  (a) the results of the constraints check performed in the first step, in particular the portions of the state-transition diagram that do not meet the constraints, and
  (b) the suggested modifications determined in the conflict resolution step. The designer can respond interactively by indicating that he accepts one of the suggested modifications, or can modify the state transition function manually. In the former case, the constraints check and conflict resolution is completed. In the latter case, the modified (portions of the) state transition function will be processed, starting again with the constraints checking step.

Conflict Resolution Implementation

Figure 11:
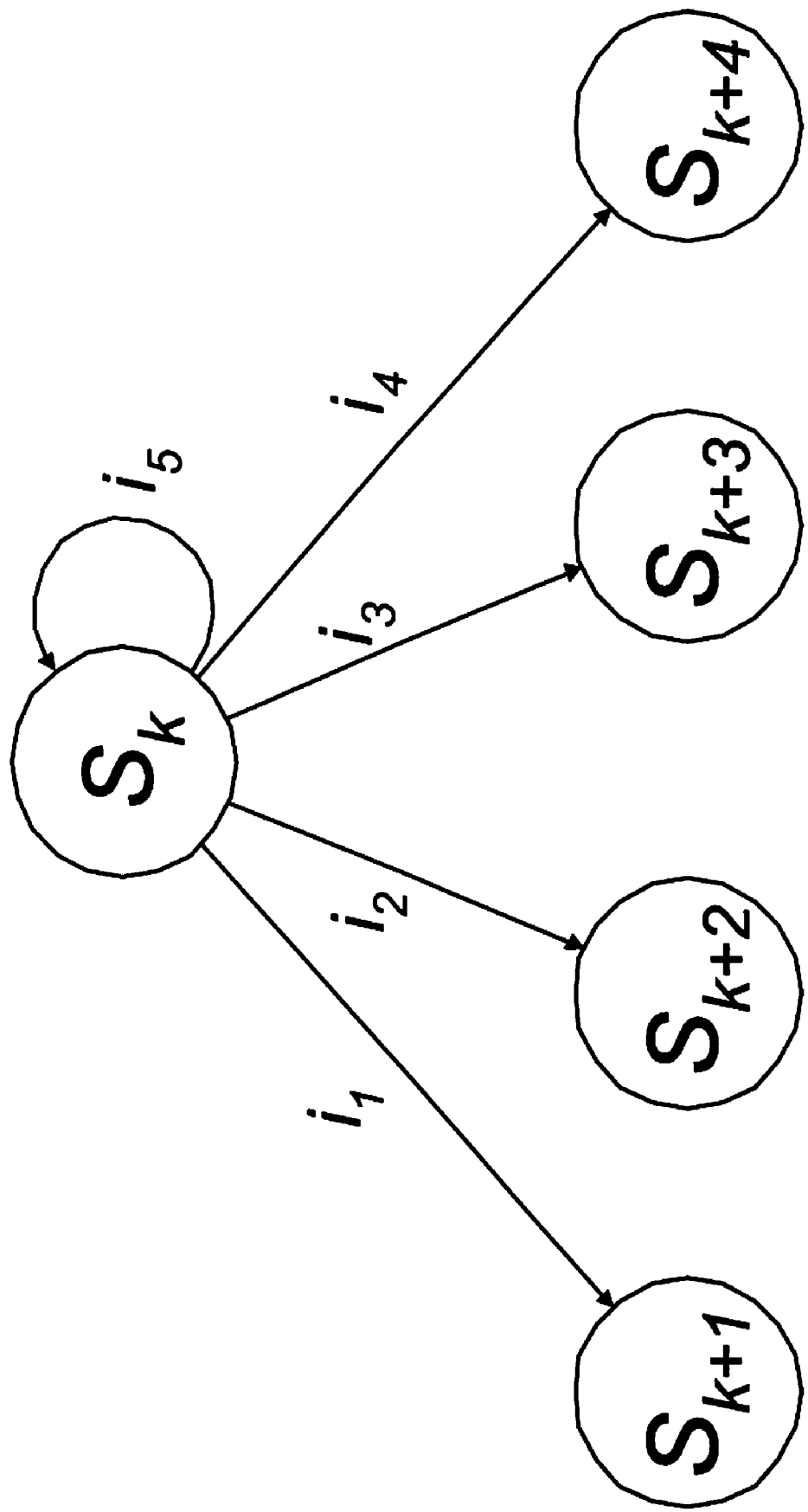
FIG. 11: Is a state transition diagram.
Figure 12:
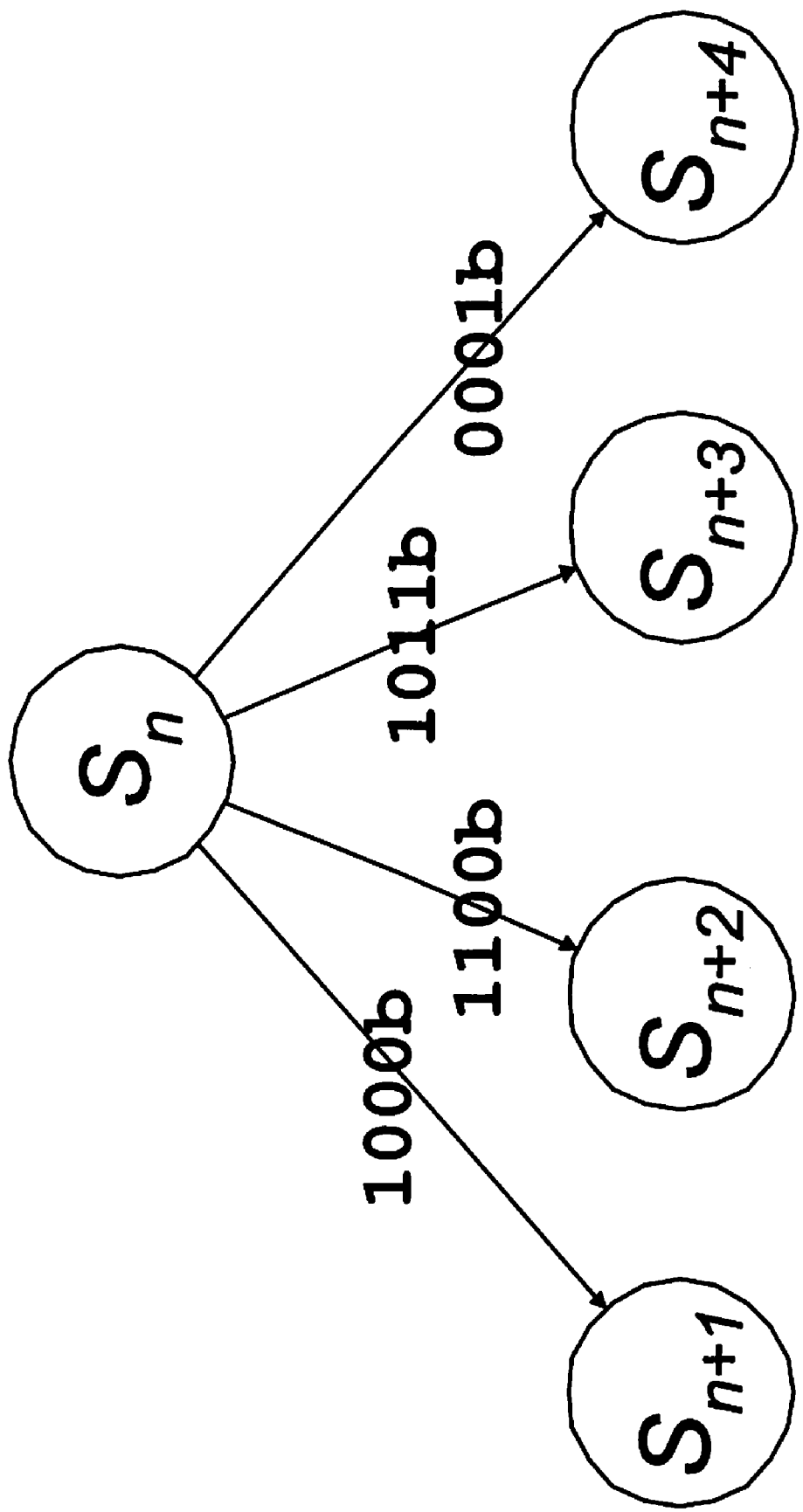
FIG. 12: Is a state transition diagram.

In a first preparing step, a designer of a state machine engine needs to specify the state transition function for the FSM implemented by the state machine engine. FIGS. 11 and 12 are examples for state transition diagrams. In both FIGS. $S_k$ and $S_n$ represent states, $i_1$ to $i_5$ represent some given input vectors of which the actual value is not relevant to the example, and 1000b to 0001b represent a set of input vectors in binary representation, for which the actual value is relevant to the example.

The state diagram in FIG. 11 illustrates the following list of state transitions:

$S_k \, i_1 \rightarrow S_{k+1}$
$S_k \, i_2 \rightarrow S_{k+2}$
$S_k \, i_3 \rightarrow S_{k+3}$
$S_k \, i_4 \rightarrow S_{k+4}$
$S_k \, i_5 \rightarrow S_k$ Whereas the state diagram in FIG. 12 illustrates the following list of state transitions:

$S_n \, 1000b \rightarrow S_{n+1}$
$S_n \, 1100b \rightarrow S_{n+2}$
$S_n \, 1011b \rightarrow S_{n+3}$
$S_n \, 0001b \rightarrow S_{n+4}$ For the preferred embodiment of the conflict resolution, the list of state transitions needs to be derived from a state transition function description provided by the designer. This preparing step can be performed using well-known methods. The list of state transitions will then be checked against certain types of constraints for the state transitions. This step is called the constraints checking step.

For the preferred embodiment of the conflict resolution at least two types of constraints for state transitions will be supported. The first constraint type consists of an upper bound on the total number of state transitions that originate from the same state. The second constraint type involves limitations on the input vectors that are associated with the state transitions from the same state, in particular the bit positions in which these can be different. Additional constraint types are not excluded and can be handled in a similar way.

For the first type of constraint, an array of counters, one for each state, each of which represents the number of transitions corresponding to that state, will be created. The initial value of each counter is zero. While processing the list of state transitions, the counter corresponding to the "current" state involved in each transition processed will be incremented. In case of a wildcard condition for the current state, all counters in the array will be incremented, as this state transition relates to all states. After incrementing a counter, it will be checked if the counter value is greater than the specified bound. If so, the corresponding state will be recorded as being in conflict with the constraint.

For example, if a constraint is specified that limits the number of state transitions to at most 4 transitions per state, it will be determined for the state diagram shown in FIG. 11, that state $S_k$ has 5 transitions and consequently conflicts with this constraint.

For the second type of constraint, a set will be created for each state. These sets contain all input values that correspond to the state transitions of the particular state. Then the logical exclusive-or-product (XOR-product) for each combination of input values in that set will be created, which reflects the bits in which the input values are different from each other. The actual constraint, i.e., the limitation on the bit positions in which the various input values are different from each other are then checked on the XOR products.

For example, for state $S_n$ shown in FIG. 12 the following set of input values that corresponds with the four transitions of state $S_n$ will be created:

i) {1000b, 1100b, 1011b, 0001b}

The XOR-product is then determined for each combination of input values:

i) XOR-product 1: 1000b xor 1100b=0100b
ii) XOR-product 2: 1000b xor 1011b=0011 b
iii) XOR-product 3: 1000b xor 0001b=1001b
iv) XOR-product 4: 1100b xor 1011b=0111b
v) XOR-product 5: 1100b xor 0001b=1101b
vi) XOR-product 6: 1011b xor 0001b=1010b The "1"/set-bits in the XOR-product indicate the bit positions at which the various input values are different from each other. All constraints of the second type can now be directly checked against the XOR-products.

For example, if the constraint would be that the input values should be different at a maximum of two bit positions, then this would mean that all XOR-products would include at most two set-bits. This is verified by counting the set-bits in each of the XOR-products. In the above example, it will be detected that XOR-products 4 and 5 are conflicting with this constraint, because these contain three set bits, meaning that the corresponding input values 1100b, 1011b, and 0001b are different from each other at more than two bit locations (as can be directly verified).

In a similar way, constraints can be checked that limit the bit positions in which the differences are allowed to occur, to specific locations within the input vectors. For example, a constraint could specify that bit differences are not allowed to occur at bit position 0 (which is the left-most bit in the above binary vectors). For this version of the constraint, each XOR-product will be tested to have only set bits at the bit positions at which differences are allowed to occur. Any set bit at a different bit location will result in the identification of a conflict with the constraint. For example, for the constraint described above, XOR-products 3, 5 and 6 are conflicting, because these contain a set-bit at bit position 0, indicating that the corresponding input vectors are different from each other at this given bit position.

The next step after the constraints checking step described above is called the conflict resolution step. In this step potential modifications of the state transition function are derived that would resolve the conflict situation and create a state transition function that meets all constraints. These potential modifications are then suggested to the designer. The derivation of potential modifications that resolves the conflicting constraints is performed separately for the two (or more) constraint types described above.

If the number of transitions for a single state exceeds a specified bound (the first constraint type), then this can be resolved potentially by creating an additional state and transferring all the "excess" number of transitions plus one, to that new state, while a new transition is created from the original state to the new state that will be used if none of the remaining transitions are taken (which are within the specified bound). If the number of transitions of the new state also exceeds the limit imposed by the constraint, the same procedure is iterated on the new state as well.

This will now be explained using the state transition function of FIG. 11. In this case, state $S_k$ has 5 transitions and consequently conflicts with the constraint that limits the number of transitions per state to a maximum of 4 transitions. Based on the above described conflict resolution step, this part of the state transition function can be modified to become the state transition function of the state transition diagram shown in FIG. 13. In this state transition diagram a new state $S_k'$ has been inserted, to which the "excess" number plus one, which equals two transitions have been transferred. A transition will be made from the original conflicting state $S_k$ to the new state $S_k'$ if none of the transitions that remain "at" state $S_k$ are used. This "else" transition is taken if the input value does not equal $i_1$, $i_2$, or is as shown in FIG. 11.

Figure 13:
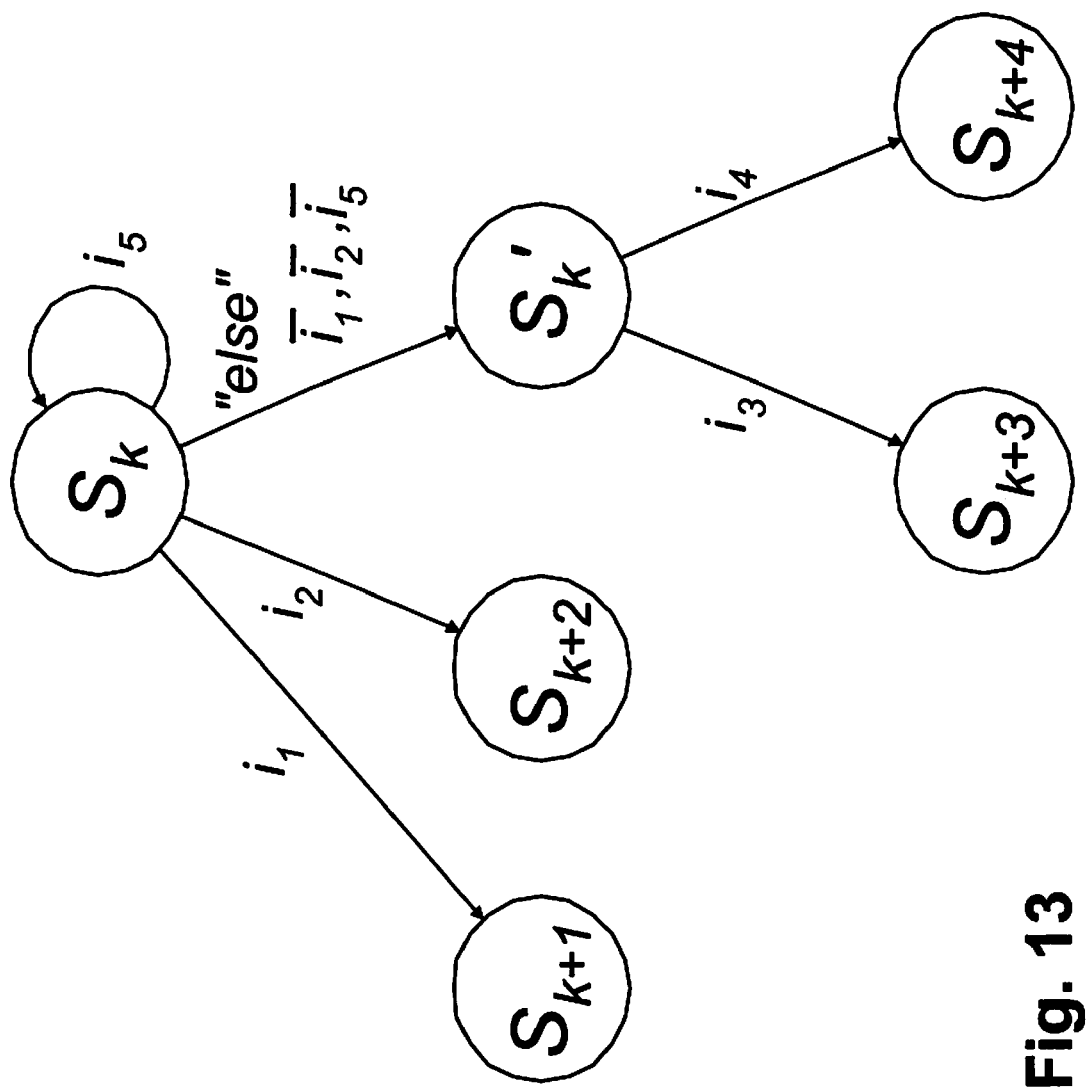
FIG. 13: Is a state transition diagram derived from the state transition diagram of FIG. 5.

Such an "else" transition is created using the B-FSM technology, by assigning it $S_k$ current state, a wildcard as input value, $S_k'$ as next state, and a priority that is lower than the other transitions that originate in state $S_k$. Furthermore, this "else" transition will not process an input value, but indicates using an instruction/output bit, that the input is put on hold, so that the current input value can be evaluated again for determining the transition to be taken from state $S_k'$. FIG. 13 shows one potential modification only. In this case, various modifications are possible, involving different transitions with input values to be transferred to the new state (e.g., the transitions with input values $i_1$ and $i_2$ or any other combination).

The second constraint type relates to the bit positions in which the input values are allowed to be different from each other. In case a conflict has been detected, then a potential modification of the state transition function can be suggested, that transfers one or multiple transitions to a new state, similar as described above for resolving conflicts for the first constraint type. However, in this case, a minimum number of state transitions will be selected for transfer to the new state, in order to meet the constraint. The latter is done by the following steps:

Step 1: A new state is created.

Step 2: In the list of XOR-products for a given state that conflicts with a constraint of this type, it is determined which transition and associated input value occur most frequently in the "problematic" XOR-products.

Step 3: This transition and input value is transferred to the new state.

Step 4: The list of XOR-products is recalculated, and any conflicts are determined.

Step 5: If there are no conflicts left, then go to step 6. If there are conflicts left then go to step 2.

Step 6: Create the "else" transition from the original conflicting state to the new state.

Figure 14:
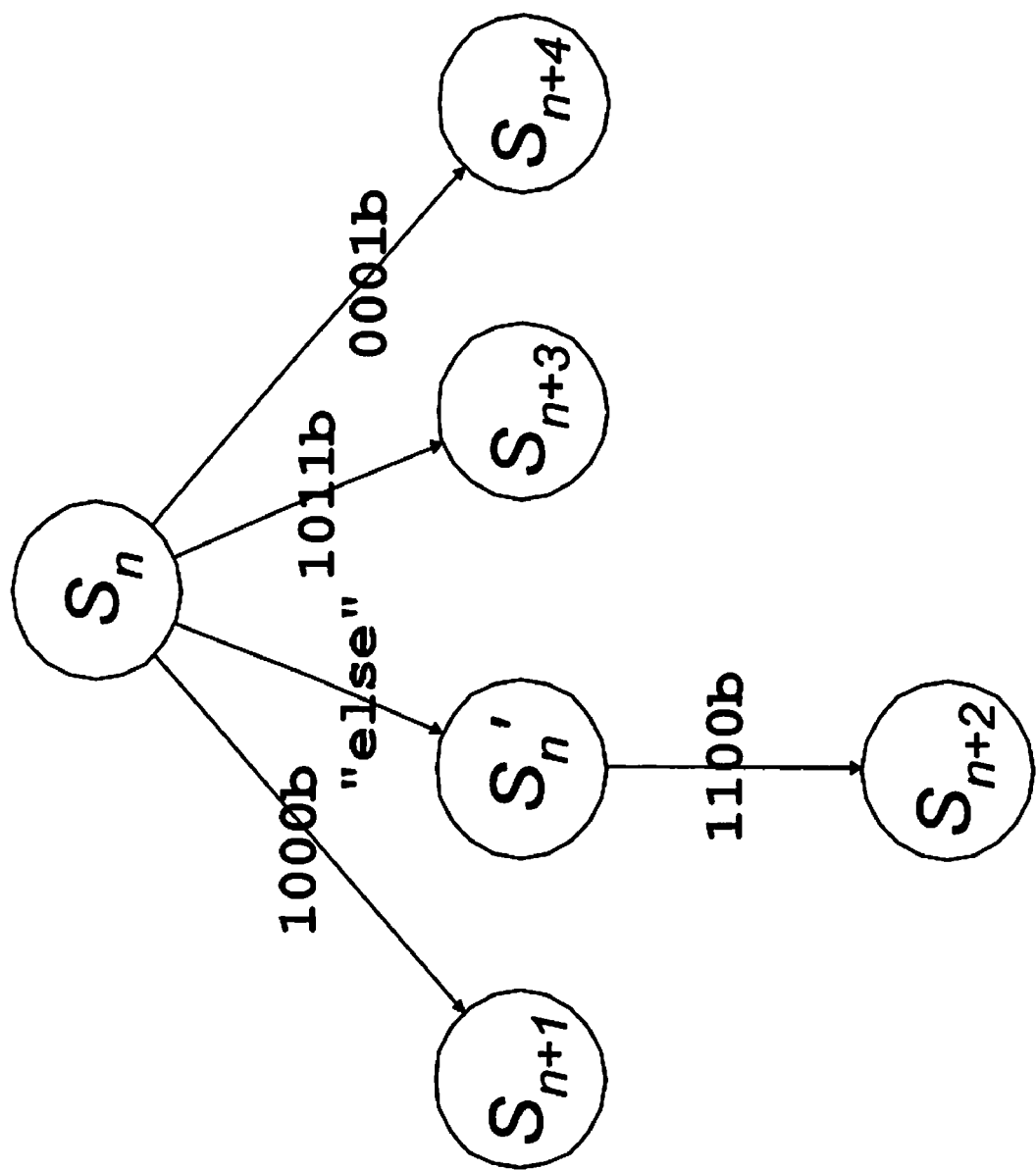
FIG. 14: Is a state transition diagram derived from the state transition diagram of FIG. 6.

Applying this on the above discussed example for the constraints checking step related to FIG. 12, involving the constraint that the input values should only be different at a maximum of two bit positions, would result in input value 1100b being identified as the input value that most frequently occurs in the problematic XOR-products, namely XOR-products 4 and 5. The corresponding state transition is transferred to a new state as shown in FIG. 14. In this case, the "else" transition is created using a wildcard for the input value, which consequently does not conflict with the other transitions from state $S_n$, and also has a lower priority.

The new state and "transferred" transitions are also checked against all constraints, and if a conflict is found, the above described procedures are repeated to identify potential modifications of the state transition function that resolves the conflict.

The final presentation step involves the presentation to the designer of the conflicting constraints that were identified in the first step, as well as the suggested modifications of the state transition function that were identified in the conflict resolution step.

The presentation can consist of a textual listing of the state number or identifier plus the corresponding list of state transitions, together with an error number indicating the conflicting constraint. It can also include a graphical representation of a corresponding state transition diagram or a portion of it, high-lighting the conflicting states and state transitions.

The suggested modifications can be presented in a similar way: textual or graphical. The designer can then indicate by responding to a question, such as "Do you accept the proposed modification?" or the like. If the designer responds, e.g., by pushing a button labeled "YES" on a computer screen to indicate an accepting answer, the modification is accepted; otherwise the designer is provided with the option to make the modifications manually. In case of multiple conflicting constraints, the designer has to respond for each conflict found. If multiple modifications are suggested, then these will be labeled with a number, and the designer can select which of the suggested modifications he accepts or reject all of them.

The conflict resolution can also be implemented without a presentation and selection step. In that case the automatically determined modifications to the state transition function are accepted without any interactions. The modified state transition function is represented as a list of state transitions. Such a list can be transformed in a description of the modified state transition function suitable as an input to existing tools using well-known methods.

Especially, the conflict resolution can be used in conjunction with a ZuXA controller. The state transition function for the FSM is then specified by the designer as a set of transition rules. A constraints checker and conflict resolution tool executed on a computer system implements a method in accordance with the present invention, the method comprising the constraints checking step, the conflict resolution step, and the presentation step. The input to this tool is a set of transition rules which are modified using this tool to another set of transition rules. This set of transition rules is then processed by a B-FSM compiler that serves as a transition function implementation tool.

The B-FSM algorithm can distribute the state transition rules in various ways over the hash table entries, and consequently, over the cache lines (upon which these hash table entries are mapped), by extracting the hash index from various bit positions (which is achieved by using various index masks) and by using various state encodings. The function that generates the data structure, which includes performing this mapping, is the B—FSM compiler.

Figure 1:
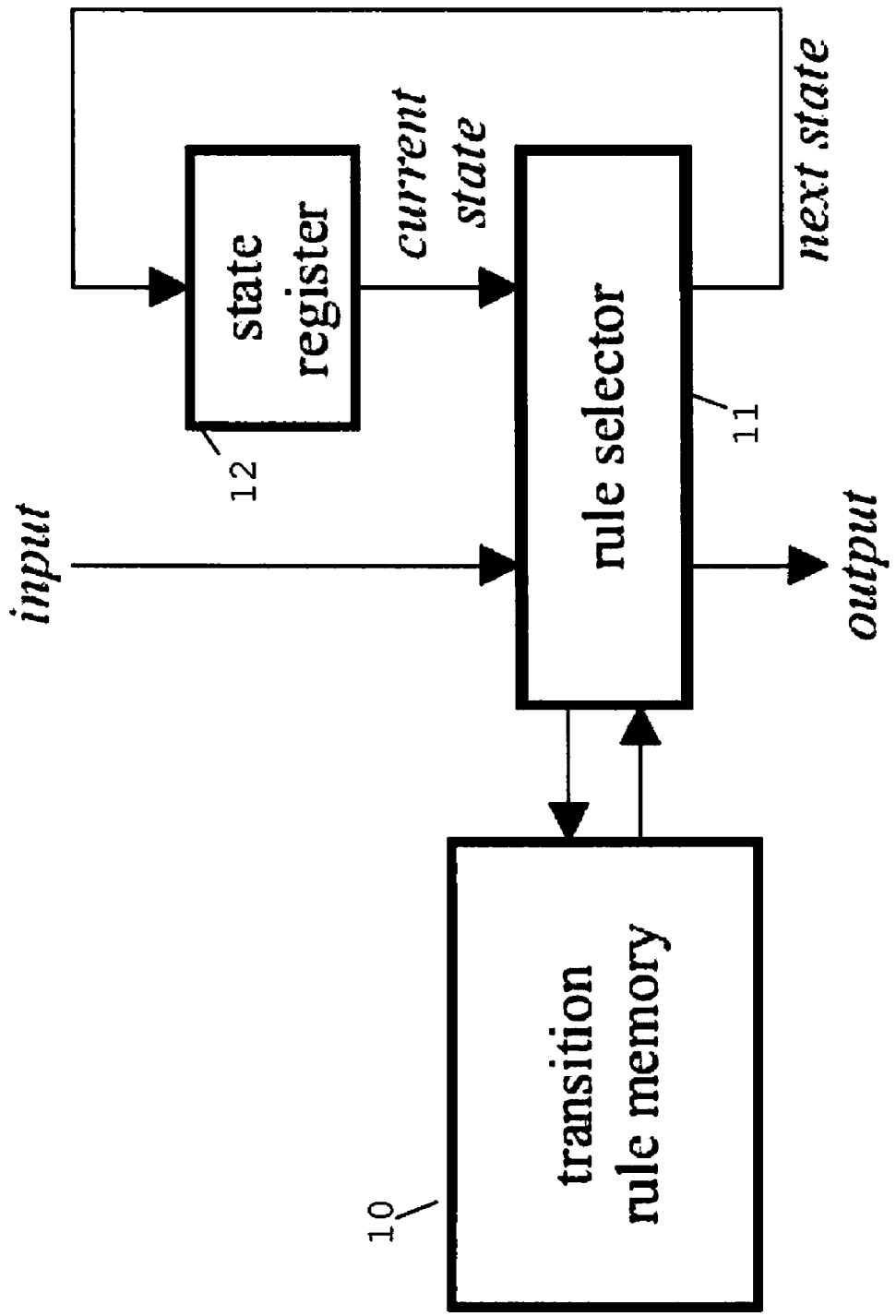
FIG. 1: Is a block diagram of a subsystem of a B-FSM controller.
Figure 3:
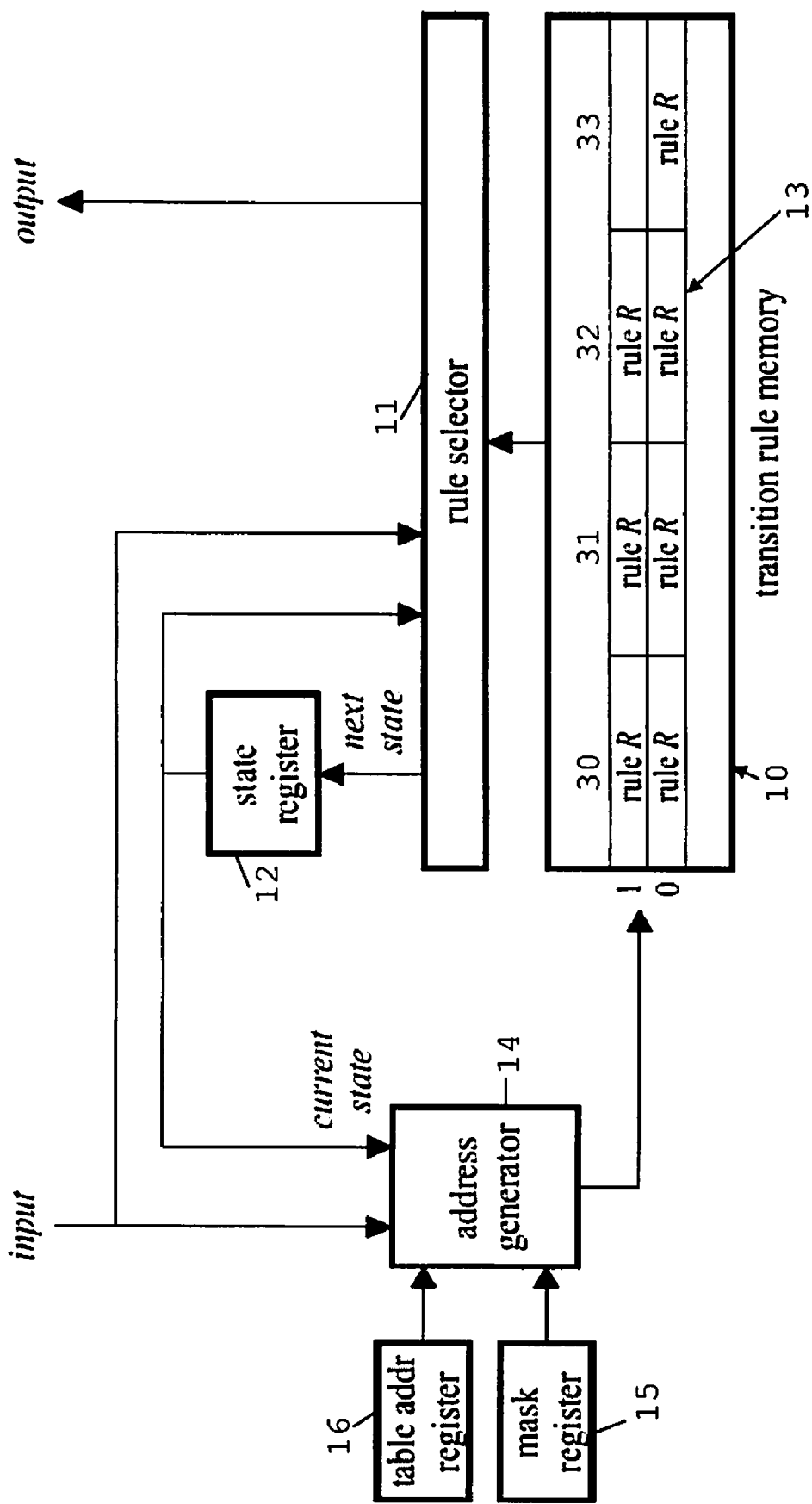
FIG. 3: Is a block diagram of a subsystem of a B-FSM controller.

The B-FSM compiler creates data structures that can be loaded to the transition rule memory 10 shown in FIGS. 1 and 3. The designer selects the modifications to the state transition function presented by the constraints checker and conflict resolution tool.

A conflict resolution method can be performed before, during, or after the determination of the probability distribution. Especially, it can also be performed during the ordering of the transition rules to cache lines and data segments within cache lines.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 15:
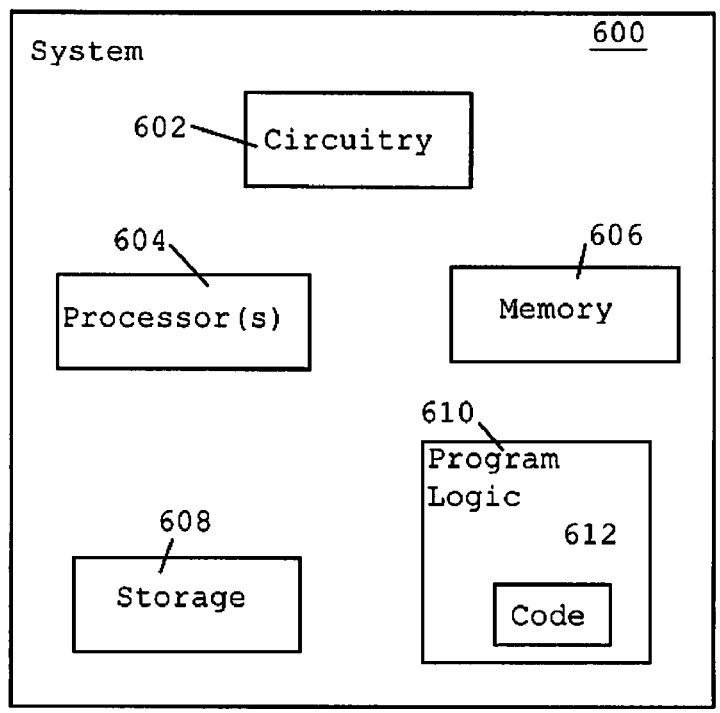
FIG. 15: Is a block diagram of a system in which certain embodiments may be implemented.

FIG. 15 illustrates a block diagram of a system 600 in which certain embodiments may be implemented. The system 600 may include a circuitry 602 that may in certain embodiments include a processor 604. The system 600 may also include a memory 606 (e.g., a volatile memory device), and storage 608. The storage 608 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 608 may comprise an internal storage device, an attached storage device and/or a network accessible storage device. The system 600 may include a program logic 610 including code 612 that may be loaded into the memory 606 and executed by the processor 604 or circuitry 602. In certain embodiments, the program logic 610 including code 612 may be stored in the storage 608. In certain other embodiments, the program logic 610 may be implemented in the circuitry 602. Therefore, while FIG. 15 shows the program logic 610 separately from the other elements, the program logic 610 may be implemented in the memory 606 and/or the circuitry 602.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in the figures and the description are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

The invention claimed is:

1. A computer-based method for changing a description for a state transition function of a state machine engine including a processor cache, the method comprising the steps of:
   determining a probability distribution of state transitions for a state transition function of a state machine engine;
   ordering the state transitions based on the probability distribution such that the state transitions are distributed to the processor cache lines;
   modifying a description for the state transition function based on the ordering; and
   performing a conflict resolution check for the description of the state transition function.

2. The method of claim 1, wherein in said ordering step the state transitions are distributed to data segments within the processor cache lines.

3. The method of claim 2, wherein the state machine engine is a B-FSM controller.

4. The method of claim 3, wherein said B-FSM controller comprises a main memory supporting a burst mode.

5. The method of claim 3, wherein the probability distribution is determined using simulations or emulations of the state transition engine.

6. The method of claim 3, wherein the probability distribution is provided by a computer user.

7. A computer program product for changing a description for a state transition function of a state machine engine including a processor cache, the computer program product comprising:
   a computer usable storage medium having a computer usable program code stored therein, the computer usable program code comprising:
   computer usable program code configured to:
      determine a probability distribution for a state transition function;
      order the state transitions of the state transition function based on the probability distribution so that the state transitions are distributed to the processor cache lines;
      modify a description for the state transition function based on the ordering; and
      performing a conflict resolution check for the description of the state transition function.

* * * * *